United States Patent
Lee et al.

(10) Patent No.: US 12,327,326 B2
(45) Date of Patent: Jun. 10, 2025

(54) METHOD AND APPARATUS FOR EFFICIENT NON-INTEGER SCALING IN NEURAL NETWORK ACCELERATORS

(71) Applicant: SINGULOS RESEARCH INC., Burnaby (CA)

(72) Inventors: Michael Scott Lee, North Vancouver (CA); Scott Chin, Vancouver (CA); Bradley Quinton, Vancouver (CA); Trent McClements, Burnaby (CA)

(73) Assignee: Singulos Research Inc., Burnaby (CA)

( * ) Notice: Subject to any disclaimer, the term of this patent is extended or adjusted under 35 U.S.C. 154(b) by 392 days.

(21) Appl. No.: 17/841,057

(22) Filed: Jun. 15, 2022

(65) Prior Publication Data

US 2022/0405881 A1  Dec. 22, 2022

Related U.S. Application Data

(60) Provisional application No. 63/210,847, filed on Jun. 15, 2021.

(51) Int. Cl.
*G06T 3/10* (2024.01)
*G06T 3/4007* (2024.01)
*G06T 3/4046* (2024.01)
*G06T 7/11* (2017.01)

(52) U.S. Cl.
CPC .......... *G06T 3/4046* (2013.01); *G06T 3/4007* (2013.01); *G06T 7/11* (2017.01); *G06T 2207/20021* (2013.01); *G06T 2207/20084* (2013.01)

(58) Field of Classification Search
CPC ........ G06T 3/4046; G06T 7/11; G06T 3/4007
See application file for complete search history.

(56) References Cited

U.S. PATENT DOCUMENTS

2022/0292637 A1* 9/2022 Huang ................ G01S 7/52039

* cited by examiner

*Primary Examiner* — Sam Bhattacharya
(74) *Attorney, Agent, or Firm* — Borden Ladner Gervais LLP; Todd Keeler

(57) ABSTRACT

Processing image data using deep neural networks is critical to many systems that desire to understand objects and their environment using camera sensors. Image scaling is a fundamental processing task required when managing image data. Although it is possible to scale image data using standard computer or graphics processors it would be highly advantageous in terms of throughput, latency and power consumption to manage image scaling using dedicated neural network hardware. The inventions contained herein provides methods to use existing neural network hardware to preform image scaling functions. Further, the inventions contained herein describe additional circuitry that can be added to neural network hardware to further enhance image scaling capabilities and efficiencies.

22 Claims, 14 Drawing Sheets

1000

1002

METHOD AND APPARATUS FOR EFFICIENT NON-INTEGER SCALING IN NEURAL NETWORK ACCELERATORS

CROSS REFERENCE TO RELATED APPLICATIONS

This application claims the benefit of priority of U.S. Provisional Patent Application No. 63/210,847, filed Jun. 15, 2021, the entirety of which is incorporated herein by reference.

FIELD

The present disclosure relates to machine learning systems, computer vision, mixed reality systems, and neural networks.

BACKGROUND

A common application of deep learning is the use of neural networks to process spatial data, such as image data. Image data may be any data created by projecting a signal onto one or more physical surfaces or sensors. The signal source may be any suitable type of signal source such as, for example, visible light, electromagnetic radiation, such as infrared or thermal electromagnetic radiation, sonar, radar, lidar, electron microscope or others. Image data contains spatial features that can be organized in representations in two-dimensional, or higher-dimensional, space. Some image data related tasks performed by neural networks include image classification, object detection, and dynamic object comprehension. In general, spatial data may include any data that represents values distributed over some spatial dimension or dimensions.

Image data is digital data with some spatial dimensions, and some number of channels. For example, image data captured by a common digital camera will have two spatial dimensions such as a height and a width where the height and width are integer values that denote the number of elements (i.e., a pixel) in the captured image data. In the case of grayscale image data, for example, the number of channels, may be equal to 1. The pixel values may take on integer values from 0-255 where 0 may represent black and 255 may represent white, and the values in between represent various values of gray. In another example, the image data may have three channels to represent color images. The three channels may correspond to the colors of red, green, blue and the values may continue to take on values from the range of 0-255 to denote the level of intensity of that color where 0 may be interpreted as the absence of the color and 255 may be interpreted as the color being present at maximum intensity. Various colors in the spectrum of visible colors may be represented as combinations of intensities of the base colors of red, green, and blue. For example, a pixel at some spatial location may have the values of 255 in the red channel, 165 in the green channel, and 0 in the blue channel. This pixel may be interpreted as an orange color.

Scaling changes the spatial dimensions of the Input image data. For example, consider an image with a height of 1080 pixels, a width of 1920 pixels, and three channels (to represent a color image). As shorthand notation, the shape of the image data (i.e., its dimensions) can be written as (1080, 1920, 3), or in general (height, width, number of channels). After applying scaling with a scaling factor of 0.5, the Scaled image data would have a shape of (540, 960, 3). Note that scaling operates on each channel independently.

Image data is captured from an analogue sensor. In the case where the sensor is a common digital camera, the sensor is an array of analog photosensors. Each photosensor measures the intensity of light at its spatial location and quantizes the value, in our examples so far, to discrete values in the range of 0 to 255. The result is a 2D array of discrete values which form the image data. Each photosensor may be able to individually measure the light intensity in wavelengths of red, green, and blue light to produce three discrete values at each spatial location of the image data. Image data can be considered as a spatial sampling of light intensity on a physical surface (the photosensor array). The spatial sampling frequency is determined by physical distance between the photosensors.

Scaling can be considered as a resampling of the original Input image data at a different spatial frequency. The scaling factor implies the new sampling frequency. For example, a scaling factor of 2 is equivalent to having sampled the original scene at twice the spatial sampling frequency of the original sensor, i.e., as if the photosensors were closer together by a factor of 2. In another example, an image scaling factor of ⅓ is equivalent to having sampled the original scene at ⅓ of the spatial sampling frequency of the original sensor (i.e., as if the photosensors were three times further apart).

A common way to perform the resampling is to apply an interpolation on the input image data. Consider when the scaling factor is 3. This means that each data element in the Input image data should be replaced by three data elements in the scaled image data. There are various ways to determine the values in the scaled image data. A simple way is to, for each data element in the scaled image data, find the data element in the input image data that is spatially the closest and copy that value. This method is referred to as nearest neighbour interpolation. Another approach is to use some form of mathematical interpolation such as linear interpolation. For two-dimensional (2D) image data, linear interpolation may be performed once in each dimension. This is referred to as bilinear interpolation. And a third common approach is to perform cubic interpolation along each dimension which, on two-dimensional image data, is referred to as bicubic interpolation. There is currently no efficient method to apply these common interpolation techniques to perform image scaling in a neural network that also runs efficiently on existing hardware, either general or custom.

In order to support emerging new deep learning techniques for processing image data such as scale selective machine learning, and dimensionally-aware neural networks it is desirable to be able to preform non-integer scaling of spatial data. Ideally this scaling could be preformed efficiently and simultaneously with the processing of standard neural network structures such as convolution and striding, however, current approaches to neural network implementation and neural network hardware acceleration do not support non-integer scaling. This limitation forces the non-integer scaling to be done outside the neural network structure, resulting in significant penalties with respect to performance, cost, and power consumption. It is therefore desirable to find new techniques to implement efficient non-integer scaling using by reusing standard neural network structures. Further it is desirable to enhance neural network specific acceleration hardware to support new hardware structures to efficiently process non-integer scaling.

Improvements to neural networks are desired.

SUMMARY

The present disclosure relates to performing scaling of any spatial data, such as image data, for example, using operations that are performed in conventional neural networks, such as the operations performed by conventional convolutional layers, and pooling layers.

The present disclosure presents methods and apparatus to enable computationally efficient non-integer scaling in deep learning systems. Specifically, the present disclosure relates to three aspects of non-integer scaling: 1) methods to repurpose conventional deep learning layers to perform scaling efficiently on existing general and custom hardware, 2) methods to enhance the hardware mapper of deep learning hardware accelerators to enable computationally efficient non-integer scaling, and 3) methods and apparatus to extend the capabilities of existing deep learning hardware accelerators for performing non-integer scaling.

In an embodiment, the present disclosure provides A method for performing data scaling on spatial data, the data scaling having a scaling factor given by N/D where N and D are positive integers, the method includes receiving input spatial data, dividing elements of the input spatial data into non-overlapping, contiguous input regions sized D×D elements, obtaining interpolation weight sets for N*N kernels, each kernel having an associated interpolation weight set, each kernel associated with an element of an scaled output region sized N×N elements, where each scaled output region is associated with a respective one of the input regions, and generating rescaled spatial data by, for each of the input regions, performing an interpolation operation that includes, using the interpolation weight set of each kernel, computing a weighted sum of the elements of input region utilizing the weight set to generate the element of the scaled output region associated with that kernel.

In an example embodiment, when the spatial data includes more than one channel (c>1), generating N*N kernels comprises generating c*N*N kernels, the c*N*N kernels forming c channel groups having N*N kernels per group, the kernels of each channel group operating on a respective channel of the input data.

In an example embodiment, the scaling factor includes a set of data scaling factors along each spatial dimension given by $N_x/D_x$ and $N_y/D_y$, and obtaining interpolation weights for N*N kernels comprises obtaining interpolation weight sets for $N_x*N_y$ kernels.

In an example embodiment, the spatial data is two dimensional and the interpolation operation is a bilinear interpolation operation of the four nearest neighbour elements, and the interpolation weight set of a kernel are normalized relative distances of the output element associated with the kernel from each of the four nearest neighbour elements of the input region associated with the output element, the four nearest neighbour elements being the four elements of the input region that are closest in distance to a particular output element.

In an example embodiment, when the scaling factor is less than one (N/D<1), obtaining interpolation weights for N*N kernels comprises obtaining, for each of the N*N kernels, a D×D array having non-zero bilinear interpolation weights at locations corresponding to four nearest neighbour elements of the input region to a given element of the scaled output region, and for each input region, performing the bilinear operation comprises, for each of the N*N kernels, performing a weighted sum between the kernel array and a D×D array formed by elements values of the elements of the input region to generate the element value of the element of the scaled output region associated with the kernel, and when the scaling factor is greater than one (N/D>1), the method further comprises padding the spatial data along each edge with one additional element, obtaining interpolation weights for N*N kernels comprises obtaining, for each of the N*N kernels, a (D+2)×(D+2) array having non-zero bilinear interpolation weights at locations corresponding to four nearest neighbour elements of a given element of the scaled output region, and for each input region, performing the bilinear operation comprises, for each of the N*N kernels, performing a weighted sum between the kernel array and a (D+2)×(D+2) array formed by elements values of the elements of the D×D input region and elements values of elements adjacent to the input region to generate the element value of the element of the scaled output region associated with the kernel.

In an example embodiment, the spatial data is two dimensional, and the interpolation operation is a bicubic interpolation operation of the sixteen nearest neighbour elements, and the interpolation weight set of a kernel are normalized relative distances of the output element associated with the kernel from each of the sixteen nearest neighbour elements of the input region associated with the output element, the sixteen nearest neighbour elements being the sixteen elements that are closest in distance to a particular output element.

In an example embodiment, when the scaling factor is less than one (N/D<1), the method further comprises padding the spatial data along each edge with two additional elements, obtaining interpolation weights for N*N kernels comprises obtaining, for each of the N*N kernels, a (D+4)×(D+4) array having non-zero bicubic interpolation weights at locations corresponding to sixteen nearest neighbour elements of the input region to a given element of the scaled output region, and for each input region, performing the bilinear operation comprises, for each of the N*N kernels, performing a weighted sum between the kernel array and a (D+4)×(D+4) array formed by elements values of the elements of the input region and elements values of elements adjacent to the D×D input region to generate the element value of the element of the scaled output region associated with the kernel, and when the scaling factor is greater than one (N/D>1), the method further comprises padding the spatial data along each edge with three additional elements, obtaining interpolation weights for N*N kernels comprises obtaining, for each of the N*N kernels, a (D+6)×(D+6) array having non-zero bicubic interpolation weights at locations corresponding to sixteen nearest neighbour elements of a given element of the scaled output region, and for each input region, performing the bilinear operation comprises, for each of the N*N kernels, performing a weighted sum between the kernel array and a (D+6)×(D+6) array formed by elements values of the elements of the D×D input region and elements values of elements adjacent to the input region to generate the element value of the element of the scaled output region associated with the kernel.

In an example embodiment, The method according to claim 1, further comprising deinterleaving the rescaled spatial data to form deinterleaved rescaled spatial data, wherein the spatial location of each element in the deinterleaved scaled data ($x_{deinterleaved}$, $y_{deinterleaved}$) is determined by:

$$y_{deinterleaved} = y_{interleaved}*N + c//N$$

$$x_{deinterleaved} = x_{interleaved}*N + c\%N$$

where c is the channel of the rescaled spatial data, ($x_{interleaved}$, $y_{interleaved}$) are spatial locations of the elements in the rescaled spatial data, // is the integer division operation, and % is the modulo operation.

In another embodiment, the present disclosure provides a hardware accelerator for performing data scaling on spatial data, the data scaling having a scaling factor given by N/D where N and D are positive integers, the hardware accelerator includes a processing element array comprising one or more processing elements configured to perform a weighted sum between a kernel array of interpolation weights and an array of element values, a controller in communication with the processing element array and configured to receive input spatial data and the scaling factor, divide elements of the input spatial data into non-overlapping, contiguous input regions sized D×D elements, obtain interpolation weights for N*N kernels, each kernel having an associated interpolation weight set, each kernel associated with an element of an scaled output region sized N×N elements, where each scaled output region is associated with a respective one of the input regions, send commands to the processing element array to utilize the N*N kernels and the input regions of the input spatial data to generate rescaled spatial data, wherein the processing elements of the processing array are configured to receive the commands from the controller, and generate rescaled spatial data by, for each of the input regions, perform an interpolation operation that includes, using the interpolation weight set of each kernel, computing a weighted sum of the elements of input region utilizing the weight set to generate the element of the scaled output region associated with that kernel.

In an example embodiment, the spatial data includes more than one channel (c>1), and the controller being configured to obtain the interpolation weights for the N*N kernels comprises the controller being configured to obtain interpolation weights for c*N*N kernels, the c*N*N kernels forming c channel groups having N*N kernels per group, the kernels of each channel group operating on a respective channel of the input data.

In an example embodiment, the scaling factor includes a set of data scaling factors along each spatial dimension given by $N_x/D_x$ and $N_y/D_y$, and the controller being configured to obtain interpolation weights for N*N kernels comprises the controller being configure to obtain interpolation weights for $N_x*N_y$ kernels.

In an example embodiment, the spatial data is two dimensional and the interpolation operation is a bilinear interpolation operation of the four nearest neighbour elements, and the interpolation weight set of a kernel are normalized relative distances of the output element associated with the kernel from each of the four nearest neighbour elements of the input region associated with the output element, the four nearest neighbour elements being the four elements of the input region that are closest in distance to a particular output element.

In an example embodiment, the scaling factor is less than one (N/D<1), the controller configured to obtain interpolation weights for N*N kernels comprises the controller configured to obtain, for each of the N*N kernels, a D×D array having non-zero bilinear interpolation weights at locations corresponding to four nearest neighbour elements of the input region to a given element of the scaled output region, and the processing elements being configured to, for each input region, perform the bilinear operation comprises the processing elements being configured to, for each of the N*N kernels, perform a weighted sum between the kernel array and a D×D array formed by elements values of the elements of the input region to generate the element value of the element of the scaled output region associated with the kernel.

In an example embodiment, the scaling factor is greater than one (N/D>1), the controller is configured to pad the spatial data along each edge with one additional element to generate padded spatial data, the controller being configured to obtain interpolation weights for N*N kernels comprises the controller being configured to obtain, for each of the N*N kernels, a (D+2)×(D+2) array having non-zero bilinear interpolation weights at locations corresponding to four nearest neighbour elements of a given element of the scaled output region, the controller configured to send the command to the processing element array to utilize the input spatial data to generate the rescaled spatial data comprises the controller being configured to send the command to utilize the padded spatial data to generate the rescaled spatial data, and the processing elements being configured to, for each input region, perform the bilinear operation comprises the processing elements being configured to, for each of the N*N kernels, performing a weighted sum between the kernel array and a (D+2)×(D+2) array formed by elements values of the elements of the D×D input region and elements values of elements adjacent to the input region to generate the element value of the element of the scaled output region associated with the kernel.

In an example embodiment, the spatial data is two dimensional, and the interpolation operation is a bicubic interpolation operation of the sixteen nearest neighbour elements, and the interpolation weight set of a kernel are normalized relative distances of the output element associated with the kernel from each of the sixteen nearest neighbour elements of the input region associated with the output element, the sixteen nearest neighbour elements being the sixteen elements that are closest in distance to a particular output element.

In an example embodiment, the scaling factor is less than one (N/D<1), the controller is configured to pad the spatial data along each edge with two additional elements to generate first padded spatial data, the controller being configured to obtain interpolation weights for N*N kernels comprises the controller being configured to obtain, for each of the N*N kernels, a (D+4)×(D+4) array having non-zero bicubic interpolation weights at locations corresponding to sixteen nearest neighbour elements of the input region to a given element of the scaled output region, the controller configured to send the command to the processing element array to utilize the input spatial data to generate the rescaled spatial data comprises the controller being configured to send the command utilize the first padded spatial data to generate the rescaled spatial data, and the processing elements being configured to, for each input region, perform the bilinear operation comprises the processing elements being configured to, for each of the N*N kernels, perform a weighted sum between the kernel array and a (D+4)×(D+4) array formed by elements values of the elements of the input region and elements values of elements adjacent to the D×D input region to generate the element value of the element of the scaled output region associated with the kernel.

In an example embodiment, the scaling factor is greater than one (N/D>1), the controller is configured to pad the spatial data along each edge with three additional elements to generate second padded spatial data, the controller configured to obtain interpolation weight sets for N*N kernels comprises the controller being configured to obtain, for each of the N*N kernels, a (D+6)×(D+6) array having non-zero bicubic interpolation weights at locations corresponding to sixteen nearest neighbour elements of a given element of the scaled output region, the controller configured to send the command to the processing element array to utilize the input spatial data to generate the rescaled spatial data comprises the controller being configured to send the command to utilize the second padded spatial data to generate the rescaled spatial data, and the processing elements being configured to, for each input region, perform the bilinear operation comprises the processing elements being configured to, for each of the N*N kernels, perform a weighted sum between the kernel array and a (D+6)×(D+6) array formed by elements values of the elements of the D×D input region and elements values of elements adjacent to the input region to generate the element value of the element of the scaled output region associated with the kernel.

In an example embodiment, the controller includes separate interpolation weight generator hardware that is configured to calculate the interpolation weight sets and send the interpolation weights to the processing array.

In an example embodiment, the controller is configured to deinterleave the rescaled spatial data to form deinterleaved rescaled spatial data, wherein the spatial location of each element in the deinterleaved scaled data ($x_{deinterleaved}$, $y_{deinterleaved}$) is determined by:

$$y_{deinterleaved} = y_{interleaved} * N + c // N$$

$$x_{deinterleaved} = x_{Iinterleaved} * N + c \% N$$

where c is the channel of the rescaled spatial data, ($x_{interleaved}$, $y_{interleaved}$) are spatial locations of the elements in the rescaled spatial data, // is the integer division operation, and % is the modulo operation.

In an example embodiment, the controller includes separate deinterleaving address translator hardware that is configured to deinterleave the rescaled spatial data to form the deinterleaved spatial data.

In an example embodiment, the deinterleaving address translator is configured to deinterleave the rescaled spatial data either prior to transmitting the resample spatial data to a subsequent layer such that the deinterleaved rescaled spatial data is transmitted, or as the resample spatial data is output from the processing elements.

In another embodiment, the present disclosure provides A machine learning engine for performing data scaling on spatial data, the data scaling having a scaling factor given by N/D where N and D are positive integers, the machine learning engine includes a processor configured to receive input spatial data and the scaling factor, divide elements of the input spatial data into non-overlapping, contiguous input regions sized D×D elements, obtain N*N kernels, each kernel having an interpolation weight set, each kernel associated with an element of an scaled output region sized N×N elements, where each scaled output region is associated with a respective one of the input regions, and generate rescaled spatial data by, for each of the input regions, perform an interpolation operation that includes, using the interpolation weight set of each kernel, computing a weighted sum of the elements of input region utilizing the weight set to generate the element of the scaled output region associated with that kernel.

BRIEF DESCRIPTION OF THE DRAWINGS

Embodiments of the present disclosure will now be described, by way of example only, with reference to the attached Figures.

DETAILED DESCRIPTION

Figure 1:
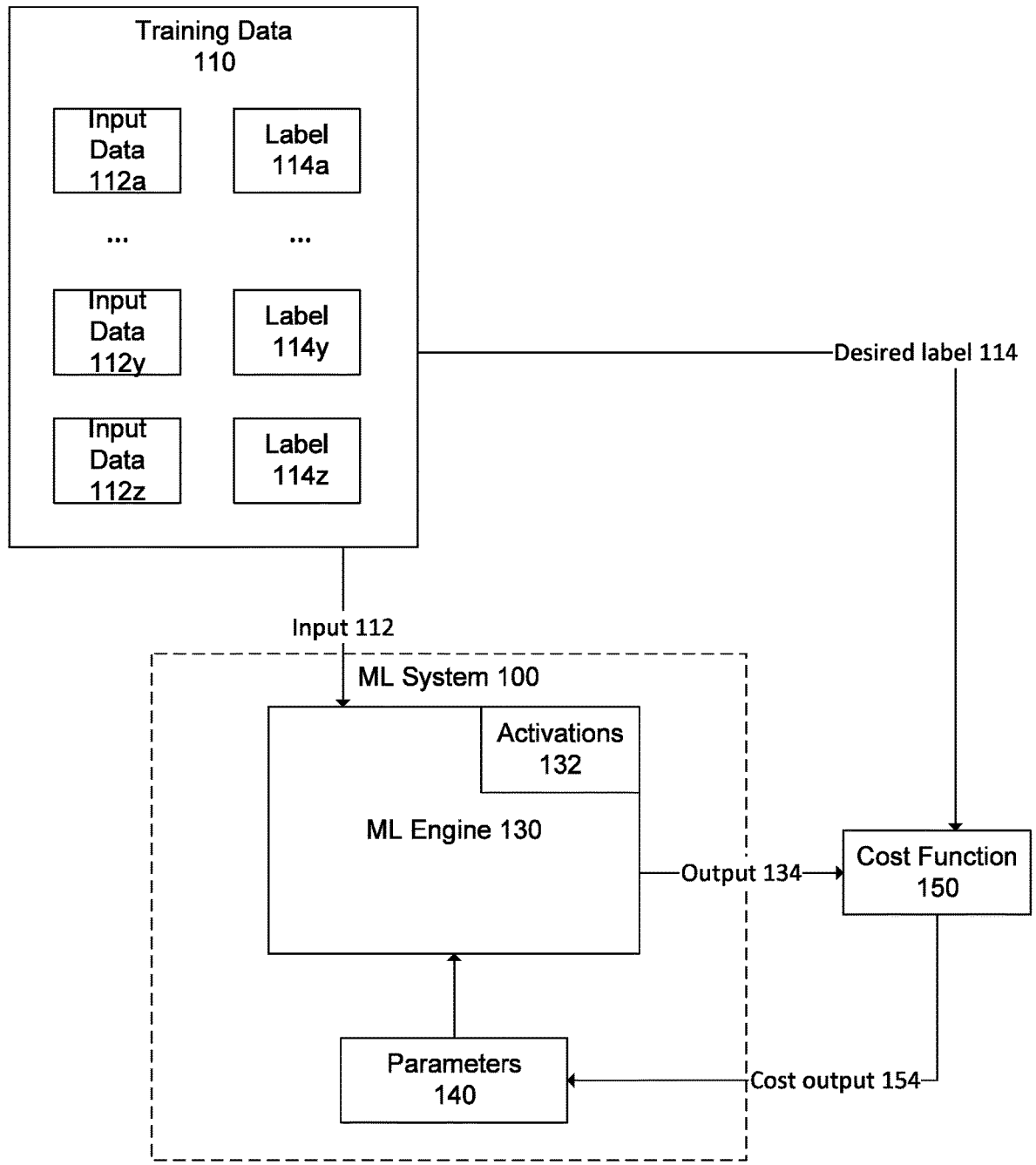
FIG. 1 illustrates a training process for a conventional machine learning system.

In an example embodiment, the present disclosure provides an apparatus and method for performing non-integer image scaling in a deep learning system.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Machine learning systems are systems that can be trained to process and analyze specific data sets to produce a decision or judgement. Machine learning system may also be trained to produce new data in some situations. The decision produced by the machine learning system may include predicting labels based on training processes having training data comprising inputs and associated labels. Subsequent testing processes may be used to validate the efficacy of the training process before deploying the machine learning system. In a deployed state, the machine learning system predicts a label for a given input on the basis of the configuration conditioned by the training process.

Generally, machine learning systems include a machine learning engine and a prediction engine. Other configurations are possible. The machine learning engine also includes parameters for conditioning calculations internal to the machine learning engine, including conditioning combinations of the calculations, including the combination which results in the machine learning engine output of the system. A neural network for example, can be implemented as a machine learning engine, where calculations internal to the neural network may be viewed as feature detectors, and the output of the feature detectors are typically referred to as activations. More generally however, calculations internal to a machine learning engine may be any type of internal calculation natural to the particular type of machine learning engine. For the sake of simplicity, regardless of the type of machine learning engine, all results of internal calculations will be referred to herein as activations.

During the training process, parameters associated with the machine learning engine are adjusted. Once training is complete, the parameter values are fixed. The fixed parameter values along with the fixed computational relationships of the machine learning engine and the prediction engine define the processing capabilities of the machine learning system and can be used to predict a label for a given data input. For example, the machine learning engine provides an output for a given input to a prediction engine for use in predicting a label associated with the given input. In this regard, the training process can be thought of as the process of finding a set of parameters for a given machine learning system that achieves a desired prediction goal for the system.

Conventionally, training data comprises a plurality of training elements, each training element having an input data and an associated label or desired label. Examples of labels include numeric or symbolic values. For example, the label may be a "one-hot" encoded vector with a length equal to the number of valid labels, with each position in the vector being used to represent each different label such that a value of '1' in the position corresponding to a specific label and values of '0' in all other locations represents another specific label. Many other label definitions are possible.

During the training process a cost function evaluates outputs provided by the machine learning engine against the corresponding desired label from the training data. Typically, the cost function is applied directly to the outputs of the machine learning engine, independent of a prediction engine. Examples of cost functions include but are not limited to: binary cross entropy, categorical cross entropy, r-squared, etc. Further, a custom-designed cost function for a specific scenario may also be used. The cost function acts as a proxy for results generated by the prediction engine, in the sense that lowering the cost should lead to more accurate predictions from the prediction Engine (however, this is not strictly true, and it is possible that lowering the cost according to the cost function does not improve the accuracy of the predicted labels). The cost function results (e.g. the cost) are used to guide the update of the parameter values which condition the behaviour of the machine learning engine with the goal of finding a set of parameter values which optimizes or lowers the cost. This can be done with a number of search and optimization methods including but not limited to: gradient descent, backpropagation, etc. The training process proceeds iteratively, updating the parameter values and evaluating the cost function until achieving a training cost goal, achieving a maximum number of iterations, or achieving a desired condition or constraint.

Once the training process is complete, the cost function is replaced with a prediction engine applied to the output of the machine learning engine, to map machine learning engine outputs to label predictions. Once the prediction engine is implemented, the machine learning system may undergo testing with a testing data set to evaluate the performance of the trained machine learning engine, or may be deployed to make predictions on given input data. Many prediction engine implementations are possible. For example, in the case where the output is a vector, the prediction engine may consider all the vector locations and then select the label corresponding to the location of the element with the largest value in the vector.

Figure 2:
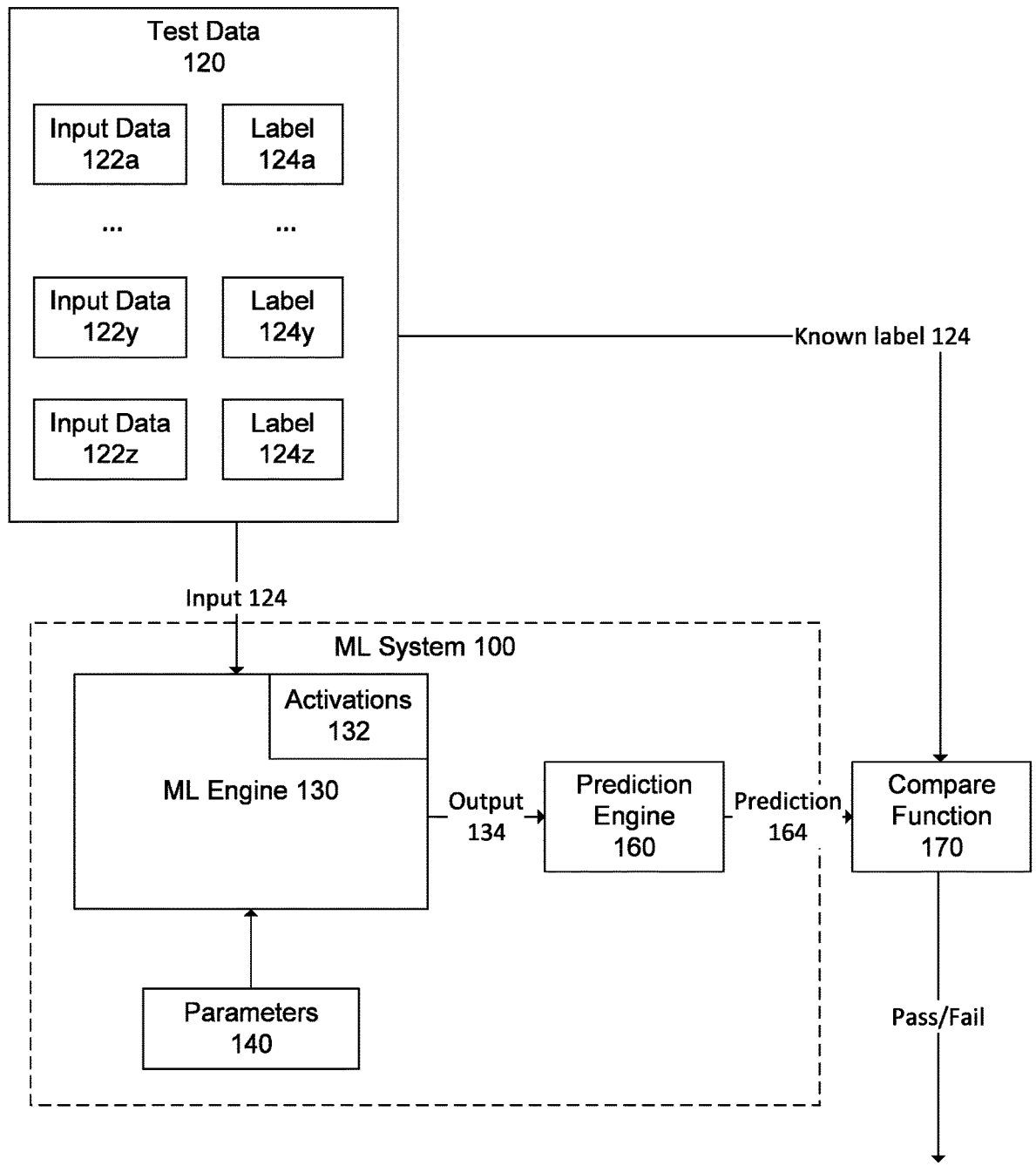
FIG. 2 illustrates a testing process for a conventional machine learning system trained in accordance with the training process of FIG. 1.
Figure 3:
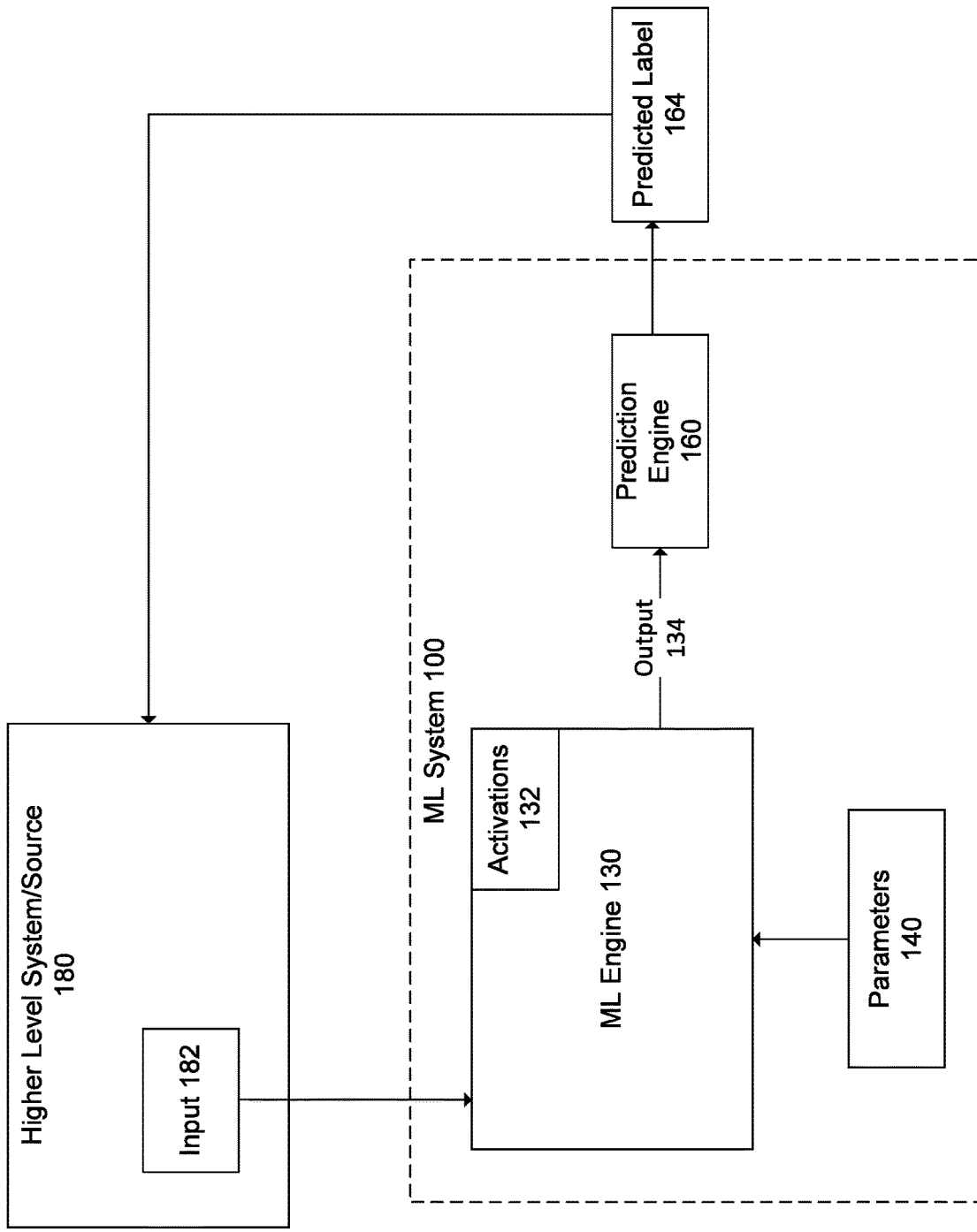
FIG. 3 illustrates a deployed machine learning system trained in accordance with the training process of FIG. 1 and optionally tested in accordance with the testing process of FIG. 2.

FIGS. 1-3 illustrate example processes respectively for training, testing, and deploying previous machine learning systems. FIG. 1 illustrates a training process for a previous machine learning system 100 which trains on a set of training data 110. The training data 110 consists of a plurality of training elements, namely a plurality of input data $112a, \ldots, 112y, 112z$ paired with a corresponding plurality of labels $114a, \ldots, 114y, 114z$. The machine learning system 100 includes a machine learning engine 130 having an associated set of activations 132 and associated set of parameters 140. During the training process, the machine learning engine 130 receives an input 112 corresponding to one of the plurality of input data $112a, \ldots, 112y, 112z$. For each input 112 received, the machine learning engine 130 generates an output 134 as a function of the parameters 140. The machine learning engine 130 provides the output 134 to a cost function 150 for comparison with a label 114 of the plurality of labels $114a, \ldots, 114y, 114z$ that pairs with the corresponding input 112. Based on the comparison, the cost function 150 generates a cost output 154 for use in tuning the parameters 140. This training process repeats until achieving a desired training goal. The final parameters and the computational relationship (architecture) of the machine learning engine can be stored and represent the trained machine learning engine 130.

FIG. 2 illustrates a testing process for a previous machine learning system 100 having a machine learning engine 130 trained in accordance with FIG. 1 and further including a prediction engine 160. The testing process can be applied to evaluate the trained machine learning engine 130 and parameters 140 using a set of test data 120 having a plurality of test elements, namely a plurality of test input data $122a, \ldots, 122y, 122z$ paired with a corresponding plurality of known correct labels $124a, \ldots, 124y, 124z$. During the testing process, the machine learning engine 130 receives an input 122 corresponding to one of the plurality of test input data $122a, \ldots, 122y, 122z$. For each input 122 received, the machine learning engine 130 generates an output 134 as a function of the trained parameters 140. The machine learning engine 130 provides the output 134 to the prediction engine 160 for generating a predicted label 164 which is provided to a comparison function 170 for comparison against a known label 124 representing a known correct label of the plurality of known correct labels $124a, \ldots, 124y, 124z$ that pairs with the corresponding input 122. If the predicted label 164 and the known label 124 do not match, then an error is considered to have occurred. The testing process continues in order to analyze any errors and determine whether the machine learning system 100 has achieved a desired goal.

FIG. 3 illustrates an example deployment scenario for a previous machine learning system 100 having a machine learning engine 130 trained in accordance with FIG. 1 and optionally tested in accordance with the process of FIG. 2.

In the deployment scenario, the trained machine learning engine 130 receives an input 182 from an external source 180, such as a higher level system, sensor, or data file. The machine learning engine 130 applies the parameters 140 to the input 182 to generate an output 134 which inputs to the prediction engine 160 for generating a predicted label 164. In the deployed scenario, there is no way to known whether the predicted label is correct or not.

Enlarging the spatial data is referred to as upscaling. Shrinking spatial data is referred to as downscaling. Computing the data generated by scaling involves inferring new data from the original image data.

Scaling may utilize an interpolation or resampling algorithm. Examples of such algorithms include nearest-neighbour interpolation, bilinear interpolation, bicubic interpolation, or applying another machine learning system.

Bilinear interpolation refers to a process of using an algorithm to interpolate functions of two variables (e.g., x and y) on a rectilinear 2D coordinate system whereby a linear interpolation is applied in each dimension. Bilinear interpolation utilizes a set of coefficients for performing the linear interpolation, which coefficients are referred to as bilinear interpolation weights. The collection of bilinear interpolation weights utilized for computing one element using bilinear interpolation is referred to herein as a bilinear interpolation weight set.

A scaling factor is defined as the ratio of the spatial size of the image data before scaling and after scaling. A scaling factor that is less than 1 means that a downsampling process was applied to shrink the spatial data. A scaling factor that is greater than 1 means that an upsampling process was applied to enlarge the spatial data.

Neural networks are typically constructed using various types of neural network layers. Some existing layer types, such as an upsampling layer, implement scaling, convolutional layers, implementing convolution operations, and pooling layers, implementing pooling operations. However, they are limited to implementing scaling factors that are integer values. Furthermore, they are not computationally efficient when executed on existing deep learning hardware accelerators. This is because conventional hardware accelerators are configured to efficiently perform particular operations including, for example, the operations of a convolutional layer or matrix multiply operations, neither of which operations are utilizing in conventional scaling of spatial data.

Although it is possible to implement custom neural network layers in general purpose software to perform non-integer scaling, they generally do not map well, in terms of computational efficiency, to existing general purpose hardware or custom deep learning hardware accelerators.

As noted previously, machine learning systems, such as the machine learning system 300 shown in FIG. 3, may include deep learning hardware accelerators. Deep learning hardware accelerators are dedicated hardware that may be included within a machine learning system, or in communication with the machine learning system, and that may be configured to perform specific operations related to overall functionality of the machine learning system. Deep learning hardware accelerators may be utilized increase overall efficiencies of performing specific operations by offloading these operations from a machine learning engine, such as the machine learning engine 130 shown in the machine learning system 300 of FIG. 3, or by having hardware that is specifically configured to perform the operation in a more efficient manner than is possible by the machine learning engine 130.

Deep learning hardware accelerators are typically included in a machine learning system to perform the tasks that would otherwise be performed by, for example, a convolutional layer or pooling layer of a machine learning engine, such as the example machine learning engine 130.

Figure 4:
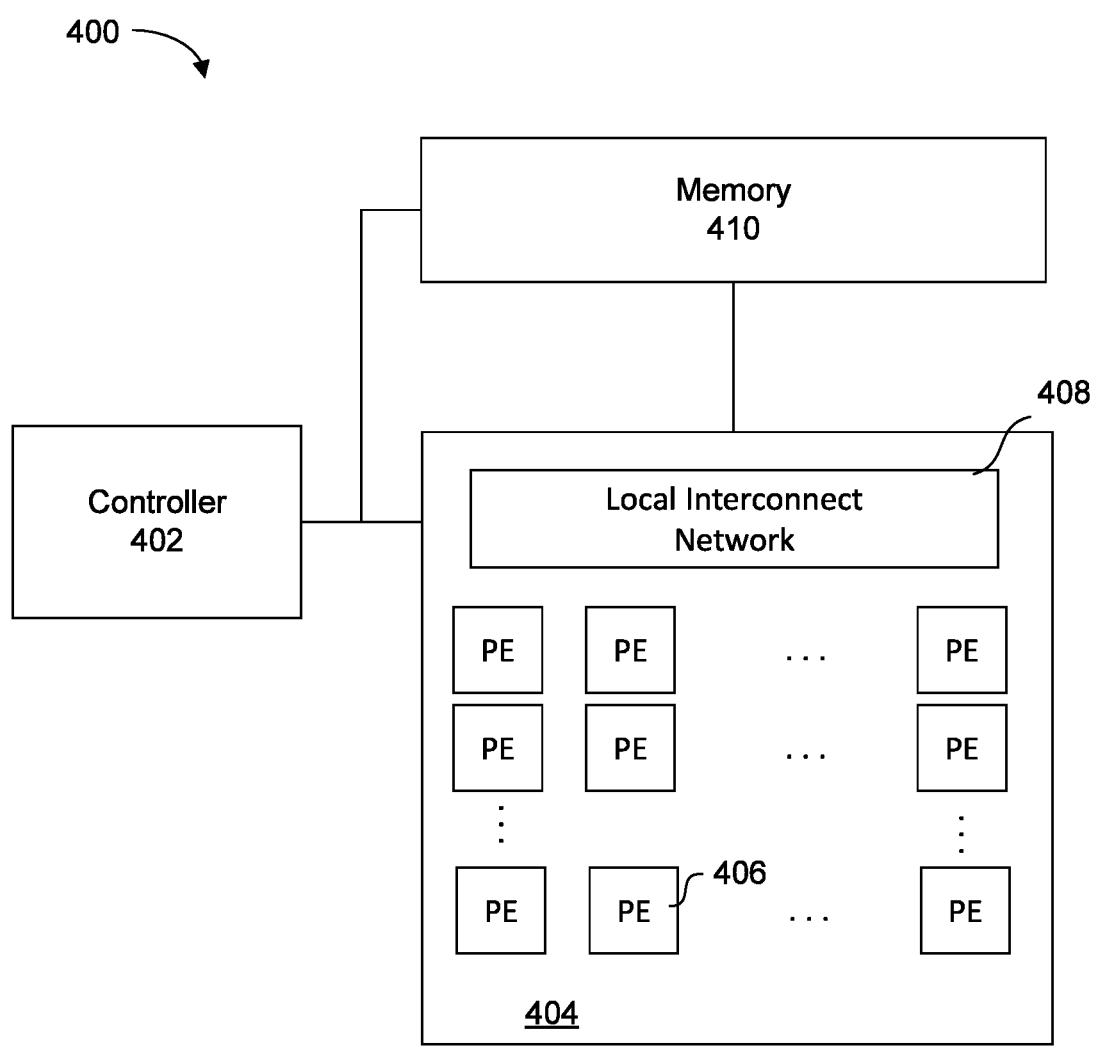
FIG. 4 is a schematic representation of a hardware accelerator in accordance with the present disclosure.

FIG. 4 shows an example of a typical deep learning hardware accelerator 400. The hardware accelerator 400 includes a controller 402, a processing element array 404, that includes a plurality of processing elements (PE) 406 and a local interconnect network interface 408, and a memory 410 that provides a buffer for storing input data to be processed by the processing element array 404 and the processed data output by the processing array 404.

The controller 402 controls the overall operation of the hardware accelerator 400, including receiving commands from higher levels such as, for example, the higher level system 180 or the machine learning engine 130 of the example deployment scenarios of FIG. 3, issuing commands to the processing element array 404, and managing data flows between the higher levels, the processing element array 404, and the memory 410.

The individual processing elements 406 may typically be configured to perform a multiply-and-accumulate operation. The processing elements 406 may include local memory and control logic to facilitate performing their specified functions.

The local interconnect network interface 408 facilitates communication between the processing elements 406, the controller 402, and the memory 410. In an example, the local interconnect network interface 408 may form a mesh network such that each processing element 406 may communicate with any other processing element 406 of the processing element array 404. In general, and suitable network topology may be utilized.

Conventional hardware accelerators, such as the example hardware accelerator 400, may typically be configured to efficiently perform the operations of, for example, a convolutional layer, though hardware accelerators can be utilized to perform the operations of pooling layers, by breaking down the basic operations in a convolutional layer into the operations that can be performed by a processing elements of the accelerator, such as the PEs 406 of the example processing element array 404.

Each processing element in a conventional hardware accelerator is configured to perform a multiply-add operation in which the processing element reads two operands from memory, multiplies them together, reads a third operand and adds this to the product, and stores the result somewhere in memory. A convolutional layer is a more complex task than multiply-add, but it deconstructs into many multiply-add operations that can efficiently be performed by an array of processing elements. A conventional hardware accelerator, such the hardware accelerator 400, includes a hardware mappers, which schedules/maps the operations of a convolutional layer to the array of processing elements. For example, the hardware mapper determines, based on the accelerator hardware specifics and the details of the convolutional layer, which memory address to read operands from, which memory address to write operands to, which processing element should perform which parts of the convolutional layer.

In theory, hardware accelerators can be configured to do other tasks such as, for example, image scaling, but a direct mapping of these tasks, such as conventional image scaling, to the existing hardware accelerators is not very efficient.

As discussed in more detail below, in an embodiment of the present disclosure a scaling operation, such as image scaling, is mapped to the operations performed by a convolution layer. The convolution layer may be performed by a machine learning engine, such as the example machine learning engine 130 described with reference to FIG. 3, or by a hardware accelerator, such as the example hardware accelerator 400 described with reference to FIG. 4, that is configured to perform a convolution layer.

Figure 5:
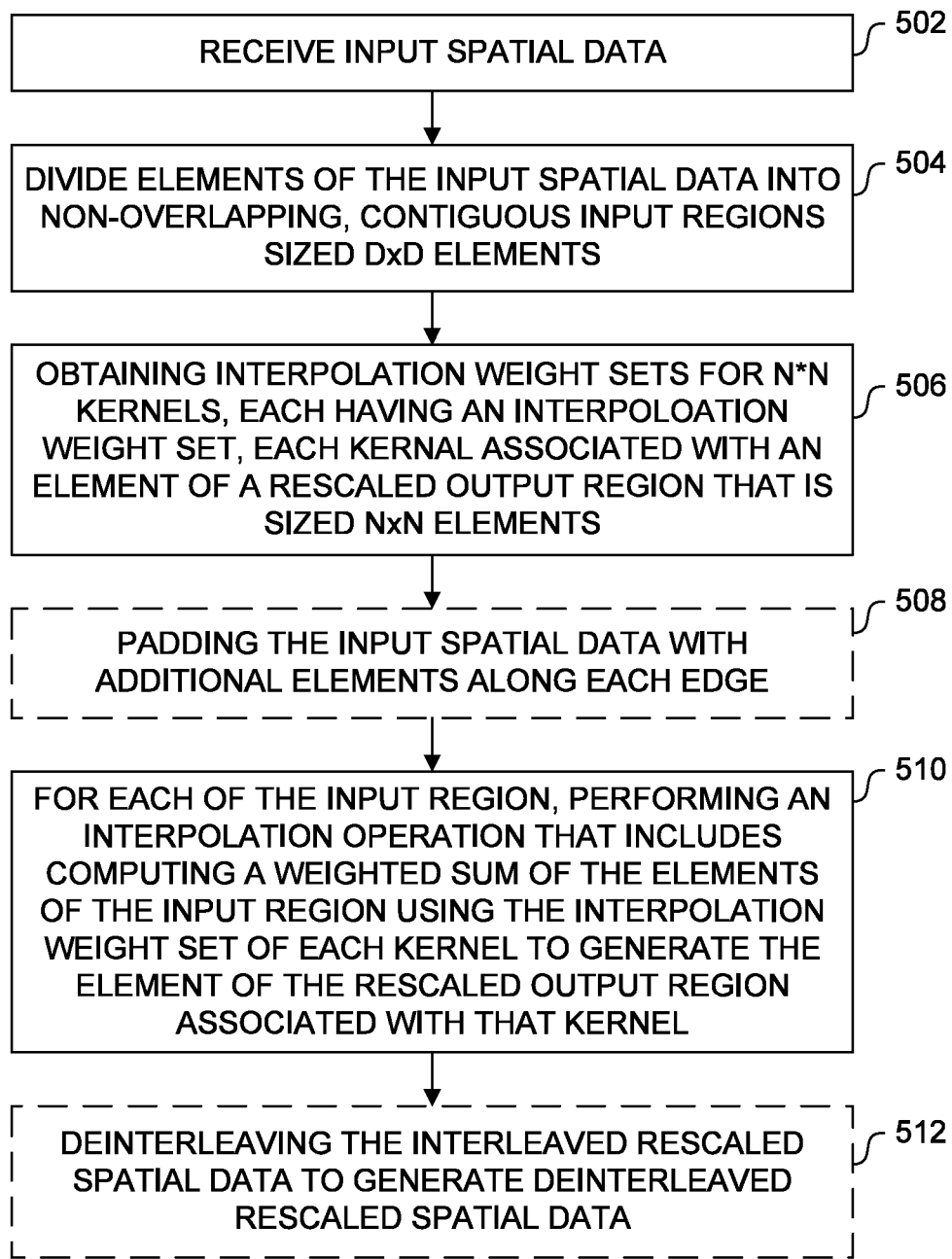
FIG. 5 is flow chart illustrating an example method for performing non-integer scaling according to an embodiment of the present disclosure.

Referring now to FIG. 5, a flow chart illustrating a method for performing non-integer image data scaling in a layer of a machine learning system, such as a convolution layer, is shown. The method may be performed by one or more processors included in components of a machine learning system, such as machine learning system 100, such as, for example, processors included in the machine learning engine 130, or processors included in a deep learning hardware accelerator, such as, for example, the processors included in the controller 402 and the processing element array 404 of the deep learning hardware accelerator 400. Different portions of the method may be performed by the processors of these different components. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable storage medium, such as a non-transitory computer-readable medium.

At 502, input spatial data is received. The input spatial data may be received at, for example, a machine learning engine, such as the machine learning engine 130, from higher level systems, such as the higher level system 180. The input spatial data may also be received at, for example, a hardware accelerator, such as the example hardware accelerator 400. The spatial data in the present disclosure may be image data, or any other suitable types of spatial data having spatial dimensions.

Receiving the input spatial data may also comprise receiving the scaling factor, N/D. In other examples, the hardware performing the data scaling may be configured to scale input data at a predetermined scaling factor, N/D, such that receiving a scaling factor with the input spatial data is not required. In some examples, the input spatial data may be scaled differently in the different dimensions, such that the scaling factor includes separate scaling factors for different dimensions. For example, for 2D input spatial data, the scaling factor may include two separate scaling factors, RID, and $N_y/D_y$, and for 3D input spatial data, the scaling factor may consist of three separate scaling factors, $N_x/D_x$, $N_y/D_y$, and $N_z/D_z$.

At 504, the input spatial data is divided into non-overlapping, contiguous input regions having D×D size dimensions. The presently disclosed example method utilizes input spatial data that is two dimensional, however a person skilled in the art could extend the disclosed method to higher dimensions by creating suitable input regions and generating additional kernels having interpolation weight sets analogous to the disclosed method and examples. For example, for 3D spatial data the spatial data may be divided into D×D×D sized input regions, and for 4D spatial data, the spatial data may be divided into D×D×D×D sized input regions, and so forth. In cases in which scaling is different along different dimensions, as described previously, the input regions may be sized $D_x \times D_y$ for 2D input spatial data, $D_x \times D_y \times D_z$ for 3D input spatial data, and so forth.

As described in more detail below, each input region of the input spatial data is rescaled to generate an associated output region of the rescaled spatial data that is generated by the disclosed method. For 2D spatial input data, the output regions will be sized N×N elements, and for 3D spatial input data the output regions will be sized N×N×N elements, and so forth. In cases in which scaling is different along different dimensions, as described previously, the output regions may be sized $N_x \times N_y$ for 2D input spatial data, $N_x \times N_y \times N_z$ for 3D input spatial data, and so forth.

At 506, interpolation weight sets for kernels are obtained. Each kernel comprises an interpolation weight set and is associated with a respective one element location of the rescaled output regions of rescaled spatial data. Generally, each data element in the rescaled output regions will require a unique interpolation weight set, which results in N*N interpolation weight sets for 2D input spatial data, N*N*N interpolation weight sets forth 3D input spatial data, and so forth. For 2D input spatial data, the number of kernels generated is N*N, and for 3D spatial data the number of kernels generated is N*N*N, and so forth. In cases in which scaling is different along different dimensions, as described previously, the number of kernels generated may be $N_x * N_y$ for 2D input spatial data, $N_x * N_y * N_z$ for 3D input spatial data, and so forth.

Obtaining the weights at 506 may include calculating and storing the interpolation weight in a memory at the beginning of the scaling process, then reading the interpolation weights from the memory as they are needed. Alternatively, weight sets for different scaling factors may be previously stored in a memory in, for example, a lookup table, in which case obtaining the interpolation weights at 506 may include determining which weight set in the table to utilize to perform the scaling. In an example in which the scaling process is performed by a hardware accelerator, such as the example hardware accelerator 400 described previously, the interpolation weights may be stored in the memory 410, and when a multiply-add operation is being performed by a processing element 406, the controller 402 transmits the appropriate memory address to the processing element 406 for the element to read the interpolation weight when the controller 402 sends commands for the processing elements 406 to perform multiply-add operations.

In an alternative embodiment, obtaining the interpolation weights at 506 may include calculating the interpolation weights each instance they are needed in order to reduce the memory resources and bandwidth utilized. The interpolation weights may be calculated, for example, on demand by, for example, a separate hardware element that is specifically configured to generate interpolation weights. The separate hardware element for generating the interpolation weights may be referred to as an interpolation weight generator. The interpolation weight generator may be configured to generate interpolation weights for multiple different interpolation techniques such that the single hardware accelerator that includes the interpolation weight generator is able to scaling utilizing any one of multiple different interpolation techniques.

The interpolation weight generator may generate the weights during operation and provide these interpolation weights to the processing elements as needed to perform the multiply-add function, rather than having these weights saved into the hardware accelerator memory. Generating the weights during operation utilizing an interpolation weight generator reduces the number of memory reads that the processing elements perform to two from three per multiply-add operation. In this example, the processing elements perform the multiply-add operation by reading one of the multiplier operands from memory, and receiving the second operand from the interpolation weight generator rather than reading this value from memory as well. Accessing memory has a significant cost in terms of power, and time, and therefore reducing the number of memory reads for each processing element reduces the power and time required for performing the scaling operation, and reduces the amount of overall hardware memory utilized which frees up a significant amount of memory leading to further benefits.

In the case in which the input scaled data includes multiple channels, scaling is conceptually performed on each channel independently. To do this, weight parameter values for kernel are first computed as if the input spatial data has a single channel. For 2D spatial data having C channels, the kernels are grouped into C groups each group having N*N kernels. Each group may be referred to as a channel group. The values of the weight sets of each kernel are 0's except in one channel. Within one channel group, the index of the non-zero weight channel is the same across all kernels of that channel group such that channel group operates on a single channel of the input spatial data. The values for the non-zero channels is set as the interpolation weights computed as if the input spatial data had a single channel. The index of the non-zero channel is different for each channel group. This configuration effectively allows each channel group to target one specific channel of the input spatial data to perform the same scaling operations.

The values of each element in the interpolation weight sets are determined based on the type of interpolation that is being performed. Examples of suitable interpolation methods include bilinear interpolation, bicubic interpolation, and nearest neighbour interpolation.

The convolution layer may be configured to have, for example, C*N*N kernels for 2D input spatial data. Each kernel's weight tensor may be configured with a shape of, for example, (D, D, C) for bilinear downscaling, (D+2, D+2, C) for bilinear downscaling, (D+4, D+4, C) for bicubic downscaling, (D+6, D+6, C) for bicubic upscaling.

The numerator N and denominator D of the scaling factor affect the number of kernels required (N*N) and the number of weight parameters in each kernel. For example, a ratio of N/D=32/35=0.9143 compared to a ratio of N/D=11/12=0.9167 yield very similar scaling factors. However, the former requires N*N=32*32=1024 kernels that each have D*D=35*35=1225 weight parameters for 2D bilinear interpolation, whereas the latter requires N*N=11*11=121 kernels that each have D*D=12*12=144 weight parameters. In another example, N/D=½, 2/4, and 3/6 all yield a scaling factor of 0.5. However, the higher values of N and D impact the configuration of the convolutional scaling layer's hyperpararameters and parameters which in turn negatively affect various computational resource metrics of the neural network system.

To address this, in some embodiments generating the kernels at 506 may include automatically selecting a modified scaling factor, N'/D', that is within a threshold amount of actual scaling factor, N/D, but that includes values of N' and D' that are lower than N and/or D, respectively, and generating the kernels based on the modified scaling factor. By utilizing the lower values of N' and D' in a modified scaling factor, computational and memory resource requirements utilized for performing the scaling operation may be reduced, while still achieving a similar targeted scaling factor.

At 508, the input spatial data is optionally padded to include additional elements along each edge. Whether this padding step at 508 is applied, and how many additional elements are include along each edge, depends on the type of interpolation that is performed and whether the scaling is upscaling or downscaling, as described in more detail below in the examples provided. In general, because interpolation is a weighted sum of nearest neighbour elements of the input spatial data to generate the elements of the rescaled spatial data, rescaled elements along the edges may lack a sufficient number of nearest neighbour elements in the input spatial data, and therefore padding additional elements along these edges may be desired.

Any suitable technique for padding the additional elements may be utilized. For example, the values of these additional elements may be computed by extrapolating new data beyond the edge of the input spatial data. A less computationally intensive technique is to pad with elements having a constant predetermined value, however this technique generally does not provide an accurate representation of the expected data beyond the edges of the input spatial data. Another suitable and relatively computationally inexpensive option is to use known padding techniques such as, for example, reflective padding or replication padding.

At 510, an interpolation operation is performed for each of the input regions to generate the rescaled spatial data. The interpolation operation includes performing a weighted sum, using the weight set included in each kernel, with an array of the values of the elements included in the input region, to generate a value of the element corresponding to the particular kernel in the rescaled output region that is associated with the input region. Applying the set of kernels to each non-overlapping contiguous input region of the input spatial data generates each of the rescaled output regions of the rescaled spatial data.

When the rescaling method described herein is performed via a convolutional layer of a neural network system or hardware accelerator configured to provide a convolution layer, output of the convolutional layer has N*N channels for 2D spatial data having uniform scaling in each dimension. Each output channel corresponds to the output of one kernel which in turn corresponds to one bilinear interpolation weight set. In other words, each channel contains the rescaled data for one bilinear interpolation weight set. For this reason, the rescaled spatial data is interleaved across channels. In an example in which the 2D input spatial data has H by W number of elements, after scaling with an scaling factor of N/D, the expected output rescaled spatial data would have a shape of H*N/D elements by W*N/D elements. This output may be referred to as deinterleaved scaled data. The output of a convolutional image scaling layer in this example has N*N channels where each channel has H/D by W/D data elements. In both cases, the number of data elements in the scaled data are the same. However, in the case of the convolutional image scaling layer, the rescaled spatial data is organized in an interleaved fashion across multiple channels, which may be referred to as interleaved scaled data.

In the case in which the input spatial data includes multiple channels, as described previously, the channels sets of the kernels will generate rescaled spatial data that includes the multiple channels as well. When the method is performed by a convolution layer, the output of the convolutional layer has C*N*N channels for 2D spatial data. These output channels may be grouped into C groups of N*N channels, where each group is interleaved rescaled spatial data corresponding to one channel of the input spatial data.

Optionally, at 512 if the rescaled spatial data is interleaved, then the interleaved rescaled spatial data is deinterleaved to generate deinterleaved rescaled spatial data. Alternatively, in some cases, the subsequent layers of the neural network to which the rescaled spatial data is input into may be configured to operate on interleaved rescaled spatial data, and in such cases no deinterleaving may be needed.

Deinterleaving may simply be a remapping of the interleaved spatial data and may be performed without computations. This mapping may be predetermined based on the scaling factor, N/D. Specifically, given an element of data in the Interleaved Scaled Data in channel C and at spatial location $y_{interleaved}$, $x_{interleaved}$, the spatial location where the element belongs in the Deinterleaved Scaled Data organization, $y_{deinterleaved}$, $x_{deinterleaved}$, can be computed using the following formulas:

$$y_{deinterleaved} = y_{interleaved} * N + C // N$$

$$x_{deinterleaved} = x_{linterleaved} * N + C \% N \quad \text{(Eq. 1)}$$

where // is the integer division operation and % is the modulo operation.

In embodiments in which the method is performed by a hardware accelerator, the hardware mapper may be configured to perform this deinterleaving.

Alternatively, the deinterleaving operation may be performed by a dedicated hardware deinterleaving address translator that is configured to deinterleave the interleaved rescaled spatial data according to Eq. 1. The hardware interleaving address translator may be included a hardware accelerator that performs the scaling operation, or as a separate hardware component. Once configured, the hardware deinterleaving address translator accepts, at time of operation, the location of an element of the rescaled spatial data in the interleaved scaled data organization, $y_{interleaved}$, $x_{interleaved}$, and generate the locations of the corresponding element in the deinterleaved scaled data organization $y_{deinterleaved}$, $x_{deinterleaved}$, using Eq. 1.

The deinterleaving optionally performed at 512 may be performed when reading interleaved rescaled spatial data from a memory prior to sending the rescaled spatial data as input to downstream layers of the neural network for downstream operations.

Alternatively, the deinterleaving may optionally be performed at 512 after the interleaved rescaled spatial data is generated, and before the rescaled data is written into a memory such that the deinterleaved rescaled spatial data is written to memory. By issuing write operations according to the deinterleaved rescaled spatial data organization, the rescaled spatial data is more likely to be stored in contiguous elements of memory according to the deinterleaved rescaled spatial data organization compared to storing the interleaved rescaled spatial data. The operations in the downstream neural network layers will typically operate on contiguous blocks of scaled data according to the deinterleaved scaled data organization. A read operation from physical memory also generally returns a continuous block of data from memory. Therefore, by deinterleaving the rescaled spatial data prior to storing to memory, the operands utilized for downstream operations may be obtained with fewer read operations compared to non-contiguously stored data. Performing fewer read operations may reduce the memory bandwidth utilized to perform the operations by downstream layers, which in turn may improve overall hardware performance metrics such as latency, throughput and power utilization, and increasing overall efficiency of the neural network system.

There are many situations where being able to perform non-integer scaling as part of a neural network is desirable apart of rescaling spatial data. One desirable application that is not directly related to the desire to rescale spatial input data is to utilize the method for performing non-integer scaling to functionally provide non-integer strides in common neural network layers. For example, convolutional layers and pooling layers are configured with a hyperparameter referred to as stride. The stride specifies how the layer's operations should repeat over the layer's input data. Conventionally, stride must be an integer value. Allowing the stride to take on non-integer values opens new avenues for neural network architectures and applications.

Thus, one application of the non-integer scaling set forth in the present description is effectively facilitate providing a convolution layer or pooling layer with an effective non-integer stride. Consider the case where a stride of s is desired on one such layer, i.e., the target layer, and s is a non-integer value. Striding by s in the target layer can be facilitated by prepending to the target layer a scaling layer with a scaling factor of 1/s, which perform scaling using the concepts described in this disclosure. Performing scaling by the scaling layer has the effect of upscaling the data by a factor of 1/s. The scaled data resulting from the scaling is then provided as input to the target layer, which is configured to use a stride=1. The overall result is that the target layer is effectively striding the original data by s, which is a non-integer value.

Figure 6:
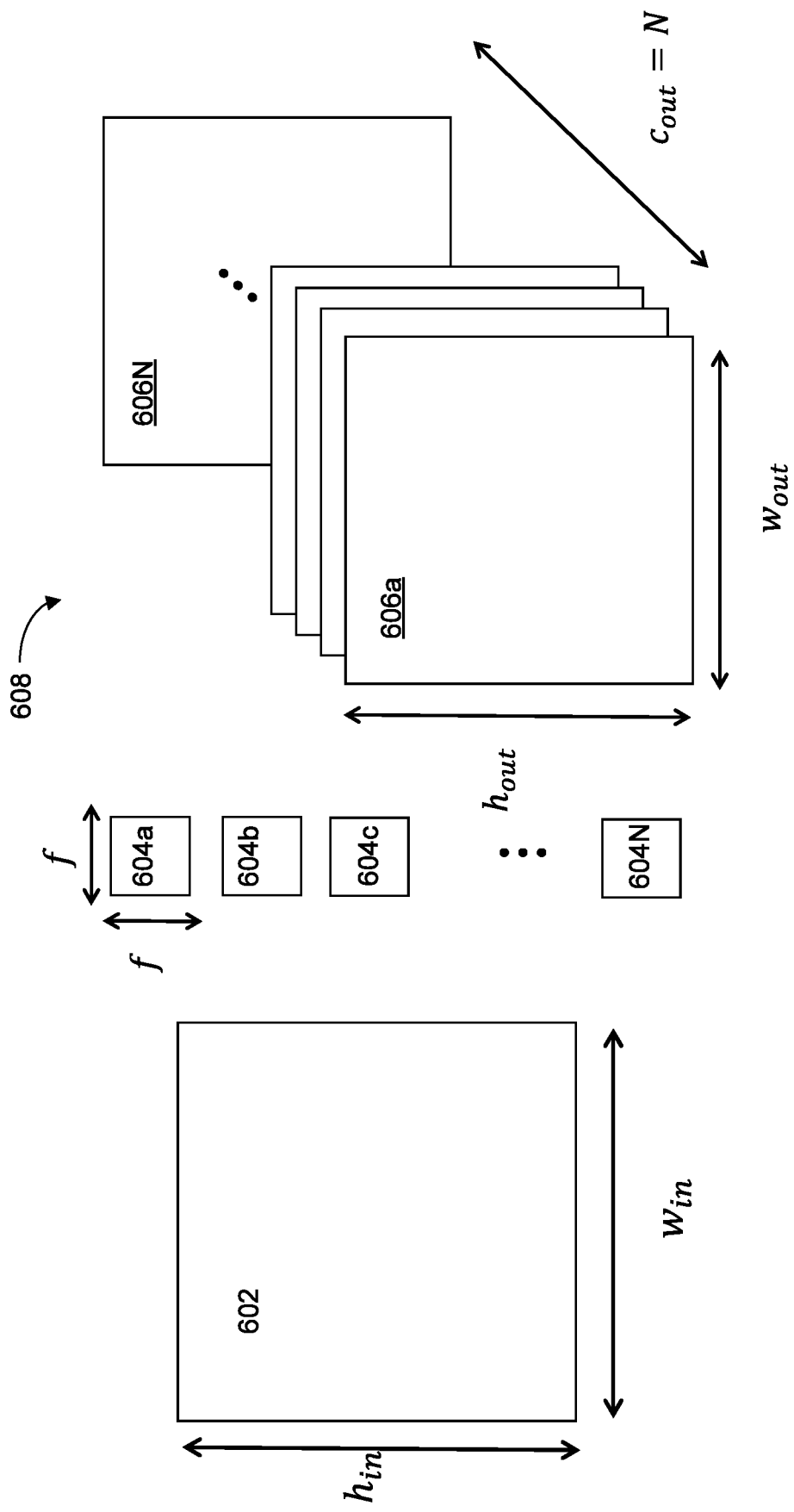
FIG. 6 illustrates performing non-integer scaling of spatial data by a convolutional layer according to the method of FIG. 5.

Referring to FIG. 6, and example of how a convolution layer of a conventional neural network may be configured to perform scaling according to method described with reference to FIG. 6 to perform scaling with a scaling factor of N/D for an example where the spatial data 602 has a single channel. In the example shown in FIG. 6, the input spatial data 602 has height $h_{in}$ and width $w_{in}$.

The convolutional layer is configured by setting the number of convolutional kernels, K, is set equal to N, resulting in kernels 604a-604N shown in FIG. 6. When the interpolation is bilinear interpolation, the shape of the kernel weight matrix, (f, f), is set equal to (D, D) and padding is set to zero elements along each edge if downscaling is performed (i.e., N<D), and the kernel weight matrix, (f, f), is set equal to (D+2, D+2) and padding is set to elements along each edge if upscaling is performed (i.e., N>D). When the interpolation is bicubic interpolation, the shape of the kernel weight matrix, (f, f), is set equal to (D+4, D+4) and padding is set to two elements along each edge if downscaling is performed (i.e., N<D), and the kernel weight matrix, (f, f), is set equal to (D+6, D+6) and padding is set to three elements along each edge if upscaling is performed (i.e., N>D). The kernel stride is set equal to D. The rescaled spatial data 603 that is generated N channels 606a-60N, i.e., $c_{out}$=N, one channel from each of the N kernels 604a-604N. Each channel has a height $h_{out}$=(N/D)*$h_{in}$ and a width $w_{out}$=(N/D)*$w_{in}$.

Figure 7:
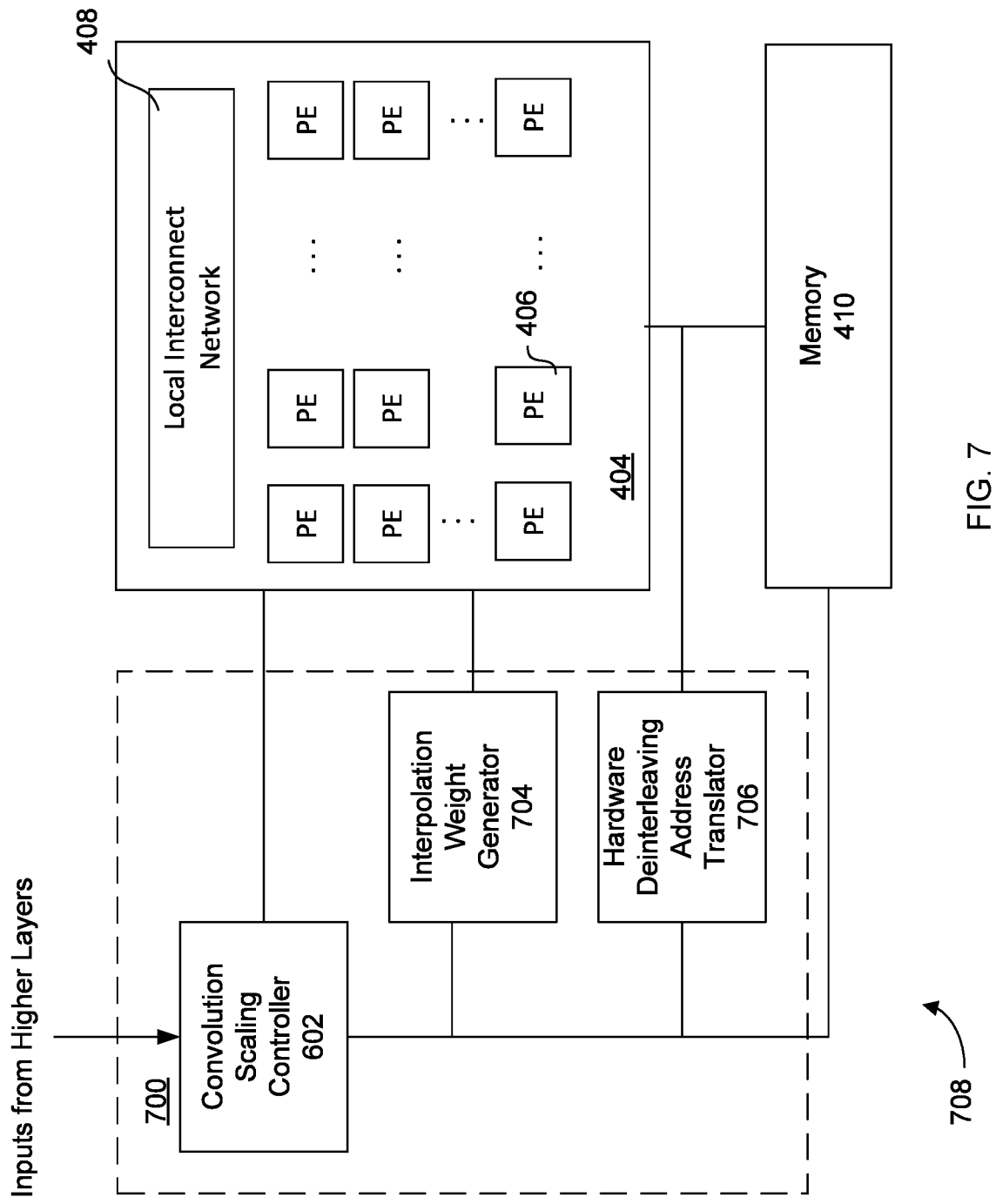
FIG. 7 is a schematic representation of a convolutional scaling engine for a hardware accelerator according to an embodiment of the present disclosure.

Referring to FIG. 7, an example convolution scaling engine 700 is shown. The convolution scaling engine 700 is specific hardware that is intended to be in incorporated into a deep learning hardware accelerator, such as the example hardware accelerator 400 shown in FIG. 4, in place of a typical controller of a hardware accelerator, such as the controller 402. The convolutional scaling engine 700 control of the processing elements of a hardware accelerator, such as the processing elements 406 of the processing element array 402 shown in FIG. 4, to form a convolution scaling hardware accelerator 708 that is configured to perform the scaling according to the method described previously with reference to FIG. 5, in a more efficient manner than utilizing the convolution layers or the hardware accelerators included in conventional neural networks.

When activated by the higher-level system, the convolutional scaling engine 700 assumes direct control of the processing elements to coordinate and dispatch appropriate data for performing the scaling operation. More specifically, a convolutional scaling controller 702 manages the processing elements of the deep learning hardware accelerator that the convolutional scaling engine 700 is incorporated into by issuing the appropriate data to the processing elements and determining the appropriate memory locations for where the processing elements should write their output. Each processing element may be sent an input region of input spatial data and the appropriate corresponding kernel that includes the interpolation weight set.

The input to the convolutional scaling engine 700 may include a scaling factor's numerator, N, and denominator, D, a pointer to the physical memory address where the input spatial data is stored, information about the dimensions of the input spatial data including a number of channels included in the input spatial data, and a pointer to the physical memory address where the rescaled spatial data is to be stored. These inputs may be supplied by the higher-level system.

The convolution scaling engine 700 shown in FIG. 7 may include an interpolation weight generator 704, which, as described previously, is hardware specifically configured to generate the interpolation weight sets that are utilized to perform the weighted sums. The interpolation set generator may be configured to generate interpolation weight sets for a single interpolation technique, or for multiple different interpolation techniques.

The convolution scaling engine 700 may optionally include a hardware deinterleaving address translator 706, which as described previously is hardware specifically configured to perform mapping interleaved locations to deinterleaving locations of the elements of the rescaled spatial data. In embodiments of the convolutional scaling engine 700 that includes a hardware deinterleaving address translator 706, the processing elements are instructed by the convolutional scaling controller 702 to write its output to the appropriate memory location according to the deinterleaved rescaled spatial data organization determined by the hardware deinterleaving address translator 708.

The following describes an example in which scaling utilizing bilinear interpolation is performed on 2D input spatial data having a single channel, C=1, for a scaling factor of N/D=⅔. Because N/D<1, this scaling operation relates to a downscaling operation.

The scaling may be performed by a convolutional scaling layer provided by a convolution layer or a hardware accelerator configured to perform convolution options of a conventional neural network, or may be performed by a customized convolution hardware accelerator that includes a convolution scaling engine 600 as described previously.

Figure 8A:
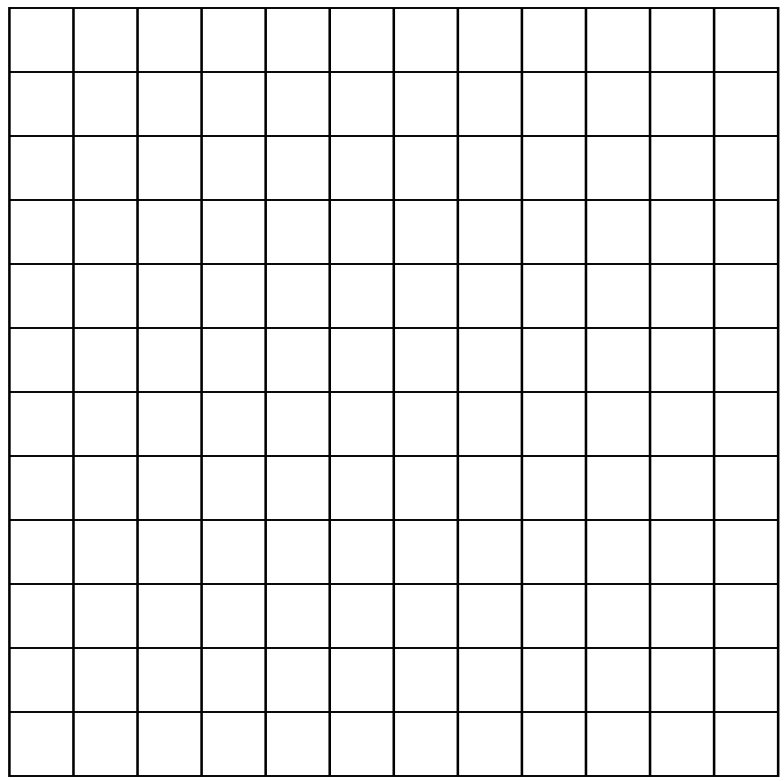
FIGS. 8A and 8B illustrate input spatial data and rescaled spatial data, respectively, in accordance with an embodiment of the present disclosure.

FIG. 8A illustrates generally how an example 2D input spatial data 800 having 12×12 elements would be scaled to generate rescaled spatial data 802 having 8×8 elements after a scaling by scaling factor N/D=⅔.

Figure 8B:
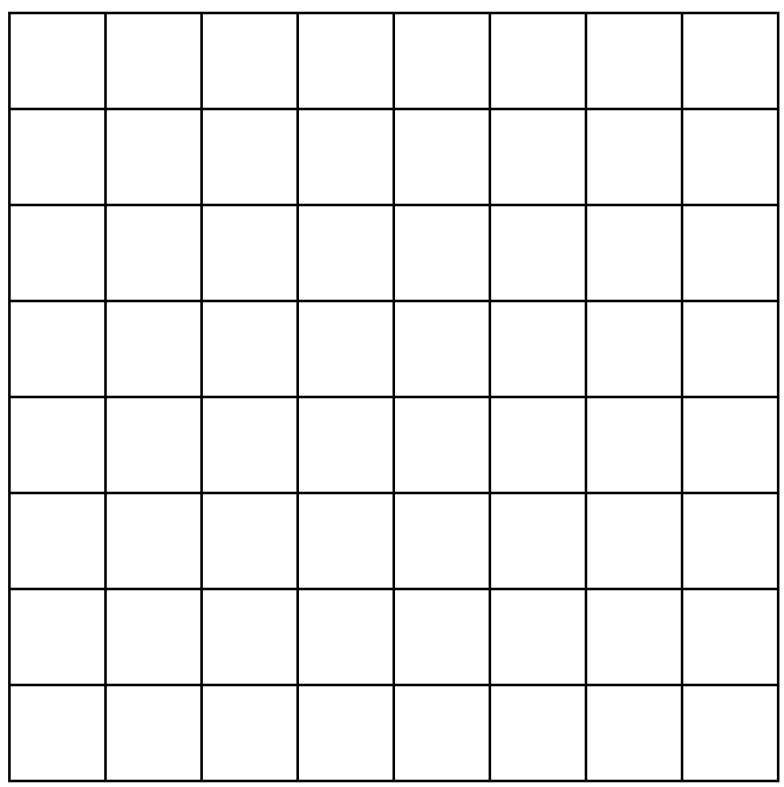
Figure 9A:
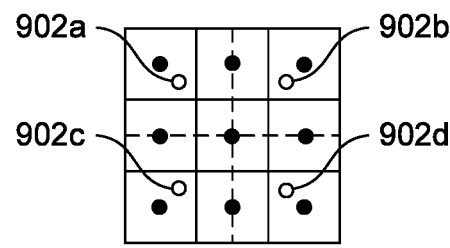
FIG. 9A illustrates an input region and an output region.
Figure 9B:
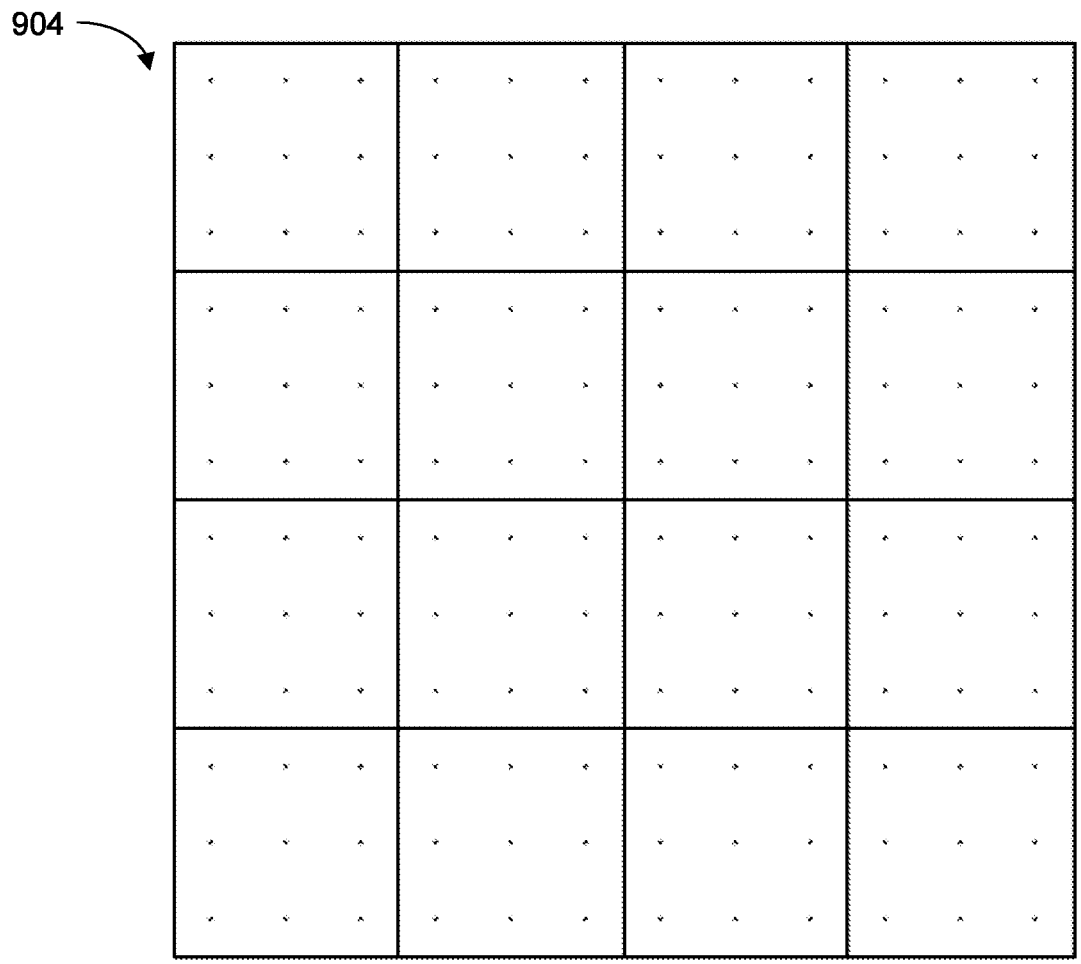
FIG. 9B illustrates input spatial data divided into input regions in accordance with the embodiment shown in FIGS. 8A and 8B.

The input spatial data is divided into non-overlapping, contiguous input regions, each D×D=3×3 elements in size, with each input region corresponding to an output region that are each N×N=2×2 elements in size. FIG. 9A shows an input region and the corresponding output region superimposed onto each other. The input region includes 3×3 elements that are illustrated by the solid lines and the solid dots, and the output region includes 2×2 elements that are illustrated by the dashed lines and open dots 902a, 902b, 902c, and 902d. FIG. 8B illustrates the input spatial data 904 which is divided into sixteen input regions, as illustrated by the solid lines, each input region sized 3×3 elements, illustrated by the solid dots.

The convolution scaling layer may be configured to have N*N=2*2=4 kernels. Each kernel corresponds to one bilinear interpolation weight set. Each kernel may configured to include a (D, D)=(3, 3) array of weight parameters that are, for bilinear interpolation, the normalized distances of the element of the output region to the four nearest neighbours of the input region, which for this example are as follows:

Kernel 0:
[[0.5625 0.1875 0.]
[0.1875 0.0625 0.]
[0. 0. 0.]]
Kernel 2:
[[0. 0. 0.]
[0.1875 0.0625 0.]
[0.5625 0.1875 0.]]

Kernel 1:
[[0. 0.1875 0.5625]
[0. 0.0625 0.1875]
[0. 0. 0.]]
Kernel 3:
[[0. 0. 0.]
[0. 0.0625 0.1875]
[0. 0.1875 0.5625]]

The kernels are each associated with an associated element of each of the output regions such that a weighted sum of the elements of the input region using a particular kernel will give the value of the element associated with that particular kernel in the output region associated with that particular input region. For example, referring to 9A and the above kernels, it can be seen that Kernel 0 is associated with element 902a, Kernel 1 is associated with element 902b, Kernel 2 is associated with element 902c, and Kernel 3 is associated with element 902d.

The stride of the kernels may be set to D=3. If the Input image data has a shape of H=1080 and W=1920, then the output would be 4 channels, each channel associated with one of the four kernels, of 360 by 640 elements.

To illustrate the interleaving pattern generated by this example, consider the same scaling factor of N/D=⅔ applied to input spatial data that has dimensions of H=9 and W=9. The output would be interleaved scaled data with four channels each with a 3×3 array of data elements. The deinterleaved scaled data should be a single channel of 6×6 elements. As expected, both organizations have 36 elements. The following is a mapping from the interleaved scaled data to the deinterleaved scaled data that is generated based on the mapping of Eq. 1, using the following notation $(y_{interleaved}, x_{interleaved}) \rightarrow (y_{deinterleaved}, x_{deinterleaved})$:

channel: 0
(0, 0)→(0, 0), (0, 1)→(0, 2), (0, 2)→(0, 4),
(1, 0)→(2, 0), (1, 1)→(2, 2), (1, 2)→(2, 4),
(2, 0)→(4, 0), (2, 1)→(4, 2), (2, 2)→(4, 4),
channel: 1
(0, 0)→(0, 1), (0, 1)→(0, 3), (0, 2)→(0, 5),
(1, 0)→(2, 1), (1, 1)→(2, 3), (1, 2)→(2, 5),
(2, 0)→(4, 1), (2, 1)→(4, 3), (2, 2)→(4, 5),
channel: 2
(0, 0)→(1, 0), (0, 1)→(1, 2), (0, 2)→(1, 4),
(1, 0)→(3, 0), (1, 1)→(3, 2), (1, 2)→(3, 4),
(2, 0)→(5, 0), (2, 1)→(5, 2), (2, 2)→(5, 4),
channel: 3
(0, 0)→(1, 1), (0, 1)→(1, 3), (0, 2)→(1, 5),
(1, 0)→(3, 1), (1, 1)→(3, 3), (1, 2)→(3, 5),
(2, 0)→(5, 1), (2, 1)→(5, 3), (2, 2)→(5, 5), Extending the above example to an input spatial data that includes two channels, C=2, and in which scaling having a scaling factor of N/D=⅔ and using bilinear interpolation is performed.

In a conventional convolutional layer, each kernel has the same number of channels as the input data. So if the input data has two channels, for example, then the kernels also typically have two channels. The convolution operation is then the weighted sum of each element in the kernel over and an input region, producing a single value.

In order to configure a conventional convolution layer, in which kernels do not operate on channels separately, to perform scaling on multi-channel input spatial data, in which scaling is desired on each channel independently, kernels that are not intended to operate on particular channel have all zeros in those channels of the kernel that correspond to channels of the input spatial data is not part of the desired computation.

Thus, in accordance with the present disclosure, $C*N*N=2*2*2=8$ kernels are generated for the present example. Kernels 0-3 may forms a channel group (channel group 0) which targets channel 0 of the input spatial data. Kernels 4-7 may form another channel group (channel group 1) which targets channel 1 of the input spatial data. The non-zero channels in channel group 0 and in channel group 1 share the same values in the example below, but they are present in different channels of the kernels.

The kernels generated in this example may be as follows:

| Kernel 0: | |
|---|---|
| Channel 0: | Channel 1: |
| [[0.5625 0.1875 0.] | [[0. 0. 0.] |
| [0.1875 0.0625 0.] | [0. 0. 0.] |
| [0. 0. 0.]] | [0. 0. 0.]] |
| Kernel 1: | |
| Channel 0: | Channel 1: |
| [[0. 0.1875 0.5625] | [[0. 0. 0.] |
| [0. 0.0625 0.1875] | [0. 0. 0.] |
| [0. 0. 0.]] | [0. 0. 0.]] |
| Kernel 2: | |
| Channel 0: | Channel 1: |
| [[0. 0. 0.] | [[0. 0. 0.] |
| [0.1875 0.0625 0.] | [0. 0. 0.] |
| [0.5625 0.1875 0.]] | [0. 0. 0.]] |
| Kernel 3: | |
| Channel 0: | Channel 1: |
| [[0. 0. 0.] | [[0. 0. 0.] |
| [0. 0.0625 0.1875] | [0. 0. 0.] |
| [0. 0.1875 0.5625]] | [0. 0. 0.]] |
| Kernel 4: | |
| Channel 0: | Channel 1: |
| [[0. 0. 0.] | [[0.5625 0.1875 0.] |
| [0. 0. 0.] | [0.1875 0.0625 0.] |
| [0. 0. 0.]] | [0. 0. 0.]] |
| Kernel 5: | |
| Channel 0: | Channel 1: |
| [[0. 0. 0.] | [[0. 0.1875 0.5625] |
| [0. 0. 0.] | [0. 0.0625 0.1875] |
| [0. 0. 0.]] | [0. 0. 0.]] |
| Kernel 6: | |
| Channel 0: | Channel 1: |
| [[0. 0. 0.] | [[0. 0. 0.] |
| [0. 0. 0.] | [0.1875 0.0625 0.] |
| [0. 0. 0.]] | [0.5625 0.1875 0.]] |
| Kernel 7: | |
| Channel 0: | Channel 1: |
| [[0. 0. 0.] | [[0. 0. 0.] |
| [0. 0. 0.] | [0. 0.0625 0.1875] |
| [0. 0. 0.]] | [0. 0.1875 0.5625]] |

When the input spatial data has $C>1$ channels, each channel group's non-zero kernel channels share the same values. In embodiments, the hardware mapper may be enhanced so that only one copy of the nonzero kernel weights needs to be stored in memory. The hardware mapper then infers which channel to place the non-zero weights as a function of the Channel Group index.

The above examples assume that conventional hardware mappers of conventional convolution layers are utilized, which have strides that start at the first element, i.e., the top-left corner of the input volume. However, in embodiments of the present disclosure, the hardware mapper may be configured to have a configurable offset in each dimension to specify what element the operation should start at. With these offsets, the zero elements included in the kernels may be reduced, which facilitates reducing the overall dimensions of the kernels. Reduced kernel size reduces the number of operations performed, and which may increase the overall efficiency of the scaling operation performed.

Extending the previous example in which single channel input spatial data was scaled using bilinear interpolation and a scaling factor of ⅔, the previously presented four kernels may be replaced with:

| Kernel 0: | Kernel 1: |
|---|---|
| [[0.5625 0.1875] | [[0.1875 0.5625] |
| [0.1875 0.0625]] | [0.0625 0.1875]] |
| Stride offset$_x$ = 0 | Stride offset$_x$ = 1 |
| Stride offset$_y$ = 0 | Stride offset$_y$ = 0 |
| Kernel 2: | Kernel 3: |
| [0.1875 0.0625] | [0.0625 0.1875] |
| [0.5625 0.1875]] | [0.1875 0.5625]] |
| Stride offset$_x$ = 0 | Stride offset$_x$ = 1 |
| Stride offset$_y$ = 1 | Stride offset$_y$ = 1 |

In another example, it can be shown that when N is even, of the N*N kernels, one quarter of the kernels contain unique weight parameter values and the other three quarter contain rotated variants of these unique weight parameters. When N is odd, of the N*N kernels, 2N−1 of the kernels do not have rotated variants. The remaining kernels one quarter will contain unique weight parameters and the other three quarter contain rotated variants.

For example, in the previously presented example in which single channel input spatial data was scaled using bilinear interpolation and a scaling factor of ⅔, the sub-matrices containing the non-zero values of each kernel weight matrix are the same with the exception that they are rotated by 90 degrees.

This feature may be exploited by configuring the hardware mapper to require that only one copy of these values is stored in memory. The hardware mapper may then enhanced to use the correct memory address for reading out the weight values as a function of the kernel index. Continuing from the above example, consider that the value 0.5625 is stored in memory address A, the value 0.1875 is stored in memory address B, the value 0.1875 is stored in memory address C, and the value 0.0625 is stored in memory address D. When reading the weights for each of the four kernels, the hardware mapper can determine the appropriate memory addresses to read from depending on the kernel index as follows:

| Kernel 0: | Kernel 1: |
|---|---|
| [[A B 0.] | [[0. C A] |
| [C D 0.] | [0. D B] |
| [0. 0. 0.]] | [0. 0. 0.]] |
| Kernel 2: | Kernel 3: |
| [[0. 0. 0.] | [[0. 0. 0.] |

| | |
|---|---|
| [B C 0.] | [0. C D.] |
| [A D 0.]] | [0. B A.]] |

In examples in which an interpolation weight generator is utilized to generate the interpolation weight sets, this same concept may be exploited to reduce the number of weights that are generated.

In other embodiments, in addition to the above, or alternative to configuring the hardware mapper to utilize offsets of reduce the zeros in the kernels, compression may be applied to the storage, or data movement of the weight parameters, or both, to reduce the size of the kernels in view of the number of zeros included in the kernels. When the input spatial data has multiple channels, there is an even higher ratio of zero to non-zero values, thereby leading to increased opportunities for compression. The above described techniques reduce memory bandwidth and storage requirements, which may improve the overall efficiency of the disclosed scaling operation.

The above example of scaling single channel, 2D input spatial data with a scaling factor N/D=2/3 is utilized to illustrate how a interpolation weight generator, such as interpolation weight generator 704, may be utilized to provide the weights.

In a first example, the interpolation weight generator may receive a kernel index, and outputs the set of weights for that kernel in some format. For example, if the interpolation weight generator is supplied with an index value 2, corresponding the Kernel 2, the output may be the following set of values: 0, 0, 0, 0.1875, 0.0625, 0, 0.5625, 0.1875, 0, which correspond to the values of Kernel 2, from left to right, top to bottom.

In another embodiment, the input of the interpolation weight generator may be the kernel index and all spatial indices such as y (the row index) and x (the column index) for 2D spatial data. The output of the interpolation weight generator in this example is a single value. For a kernel index=1, y=0, x=2, the output is the value 0.5625, corresponding to the entry at the top-right corner of Kernel 1.

In another example, the input of the interpolation weight generator may be the kernel index and some subset of all spatial indices such as y (the row index) or x (the column index) for 2D image data. The output of the interpolation weight generator is some subset of the kernel weights. For a kernel index=1 and y=0, the output is the value 0.5625, 0.1875, 0.

Other embodiments of the Interpolation Weight Generator may have different inputs and outputs. The key concept is that the weight values do not need to be stored in memory and can be deterministically computed on demand. This reduces memory storage requirements, and memory access requirements. Reduced memory access requirement may lead to an overall improvement in hardware operation metrics such as latency, throughput and power utilization.

As described previously, when performing bilinear upscaling, or bicubic downscaling and upscaling, padding of one, two, and three additional elements, respectfully, is needed along each edge of the input spatial data. This is because performing the weighted sum of the nearest elements in these cases involves elements that extend outside of the input region, and for input regions that are located along an edge of the input spatial data, no such additional elements exist.

Figure 10A:
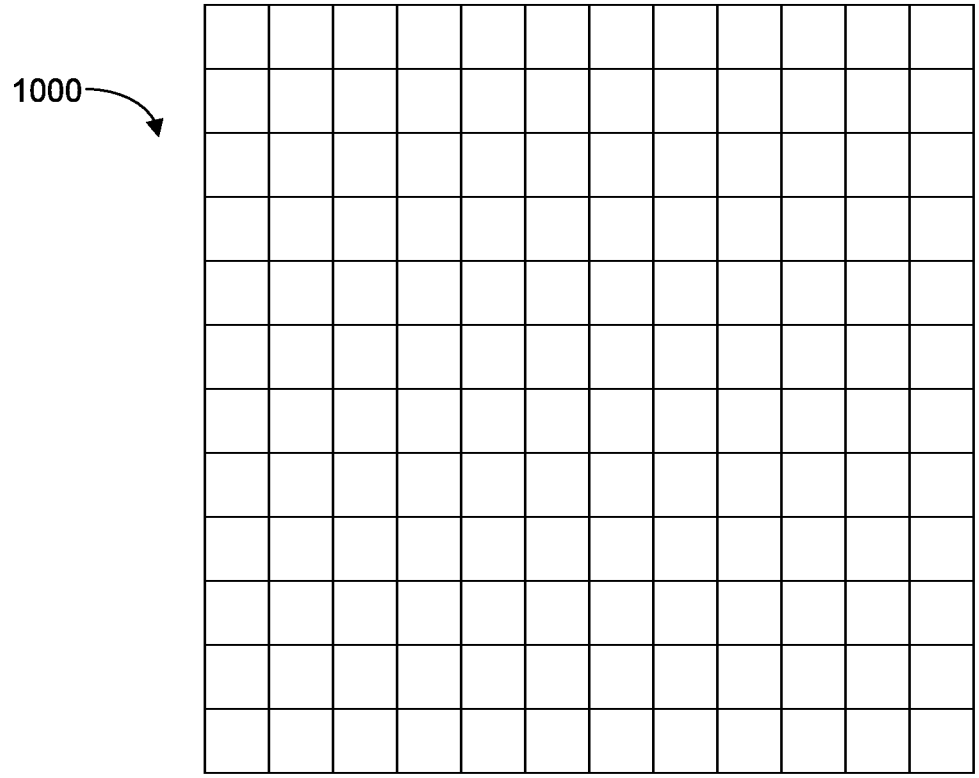
FIGS. 10A and 10B illustrate input spatial data and rescaled spatial data, respectively, in accordance with another embodiment of the present disclosure.
Figure 10B:
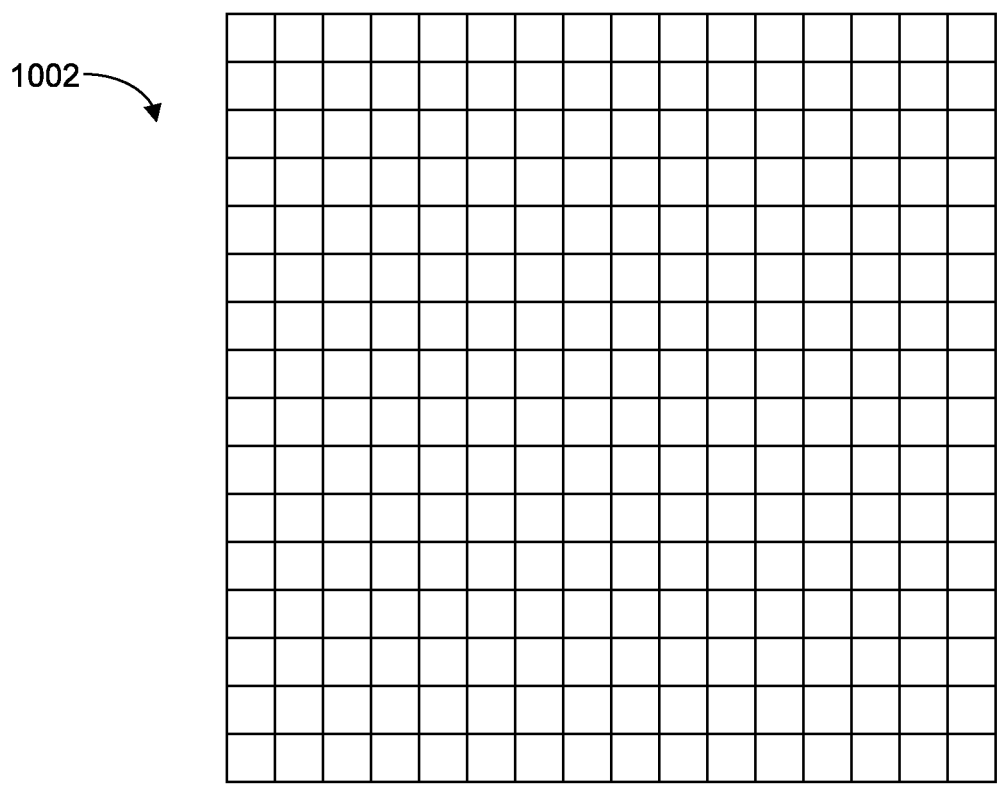
Figure 11A:
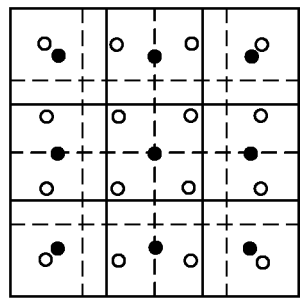
FIG. 11A illustrates an input region and an output region.
Figure 11B:
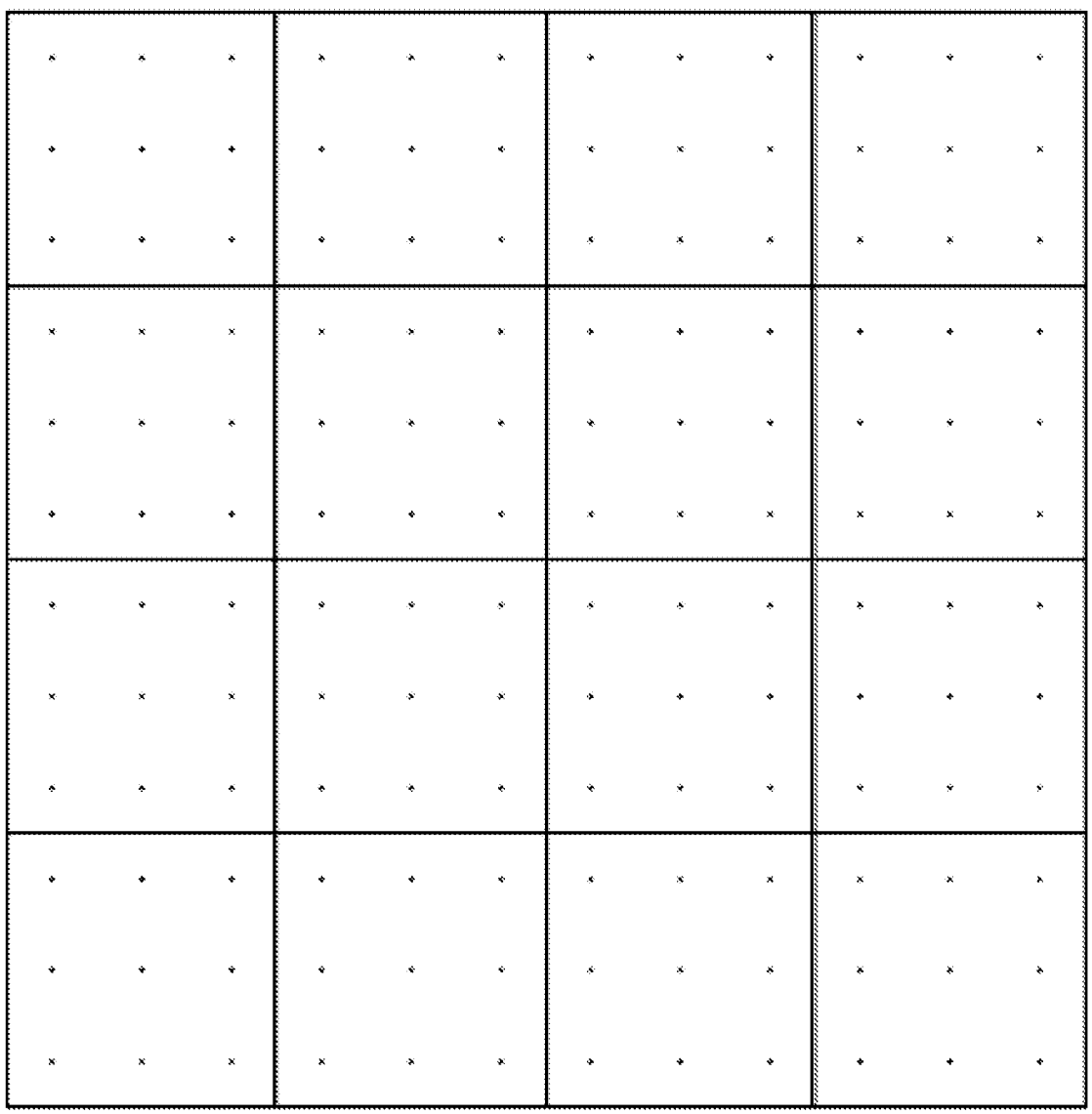
FIG. 11B illustrates input spatial data divided into input regions in accordance with the embodiment shown in FIGS. 10A and 10B.

In an example, 2D input spatial data is scaled using bilinear interpolation by a scaling factor of N/D=4/3. Referring to FIGS. 10A and 10B, the input spatial data 1000 is shown, which is 12×12 elements similar to the previous example, results in the rescaled spatial data 1002, which is 16×16 elements after scaling. As described previously, the input spatial data is divided into input regions sized D×D, which in this case is 3×3, each input region is rescaled to generate a corresponding output region sized N×N=4×4. FIG. 11A shows an example input region, illustrated by the solid lines and solid dots, superimposed with the corresponding output region, illustrated by the dashed lines and the open dots. FIG. 11B shows how the input spatial data 1000 is arranged into input regions, illustrated by the solid lines, each input region having 3×3 elements, illustrated by the dots.

Figure 12:
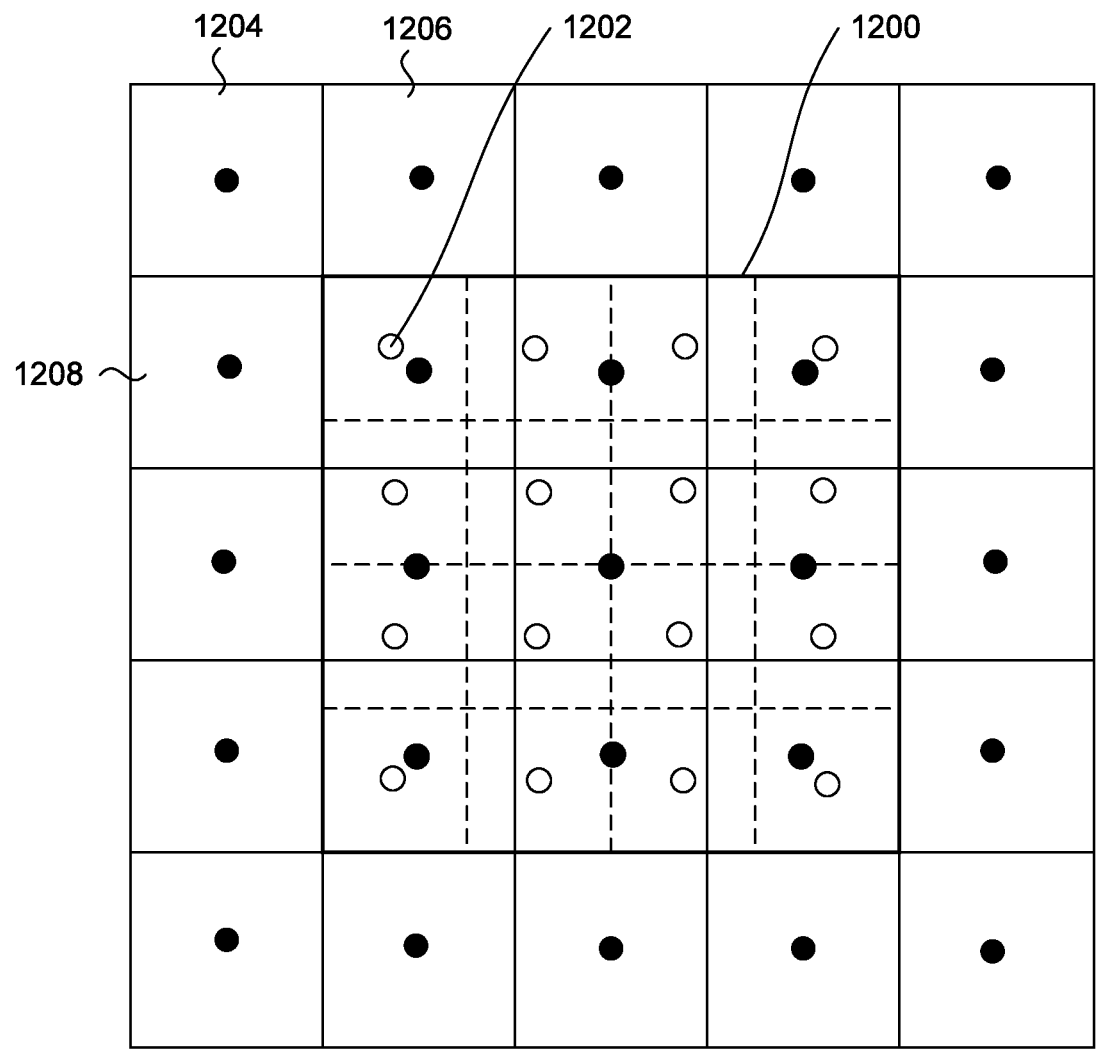
FIG. 12 illustrates additional elements around the input region of FIG. 11A.
Figure 13:
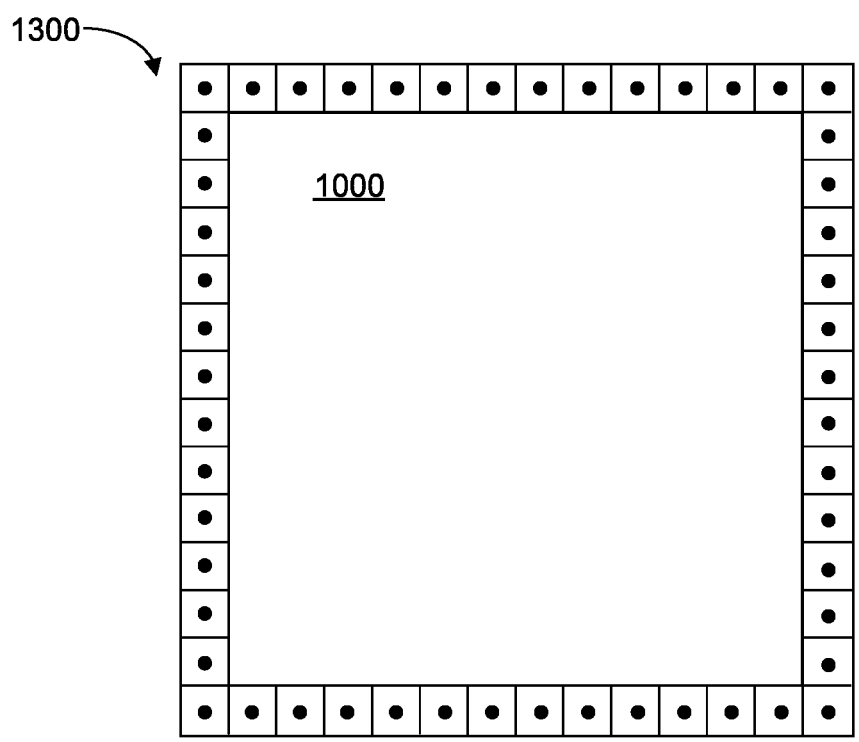
FIG. 13 illustrates padding the input spatial data of FIG. 10A with additional element along each side in accordance with an embodiment of the present disclosure.

As can be seen in FIG. 12, for some of the elements of the output region (open dots), the nearest four elements may be located outside of the input region 1200, illustrated by the bold square. For example, the element 1202 of the output region located in the top-left most corner has three nearest neighbour elements, 1204, 1206, 1208 that are located outside of the corresponding input region 1200. In the case in which the input region 1200 is not located on an edge of the input spatial data 1000, which is not an issue because elements of other input regions are available to perform the weighted sum. However, for input regions 1200 that are located on an edge of the input spatial data 1000, so such additional elements exist within the data. Padding the data with additional elements provides such additional elements.

FIG. 12 shows the input spatial data 1000 which includes padding of an additional element along each edge of the input spatial data 1000, which effectively increases the size of the input spatial data 1000 to 14×14 elements. These additional elements 1300 provide the additional elements that are utilized for input regions located along an edge of the input spatial data 1000.

If the interpolation that is being performed is bicubic, then two additional elements would be padded along edge of the input spatial data 1000 for downscaling, resulting in an increase of the input spatial data 1000 to 16×16 elements. For upscaling using bicubic interpolation, three additional elements are padded along each edge, resulting in an increase in the input spatial data to 18×18 elements.

As noted previously, and suitable padding technique may be utilized to generate the additional elements along the edges of the input spatial data 1000.

Although the previous description describes performing non-integer scaling utilizing a convolution layer of a neural network, either as a convolution layer or a hardware accelerator of a conventional neural network, or utilizing a specialized convolution scaling hardware accelerator that includes a convolution scaling engine, in another embodiment, a pooling layer, which is another common type of neural network layer, may be configured to perform non-integer scaling.

The operations of a pooling layer may be mapped to that of a convolutional layer. And as described in previous embodiments, a convolutional layer may be mapped to hardware with high computational efficiency. Some conventional deep learning hardware accelerators also contain dedicated hardware to facilitate efficient processing of pooling layers. Pooling layers can therefore be computationally efficient, and in embodiments of the present disclosure, may be repurposed and configured to perform scaling.

Figure 14:
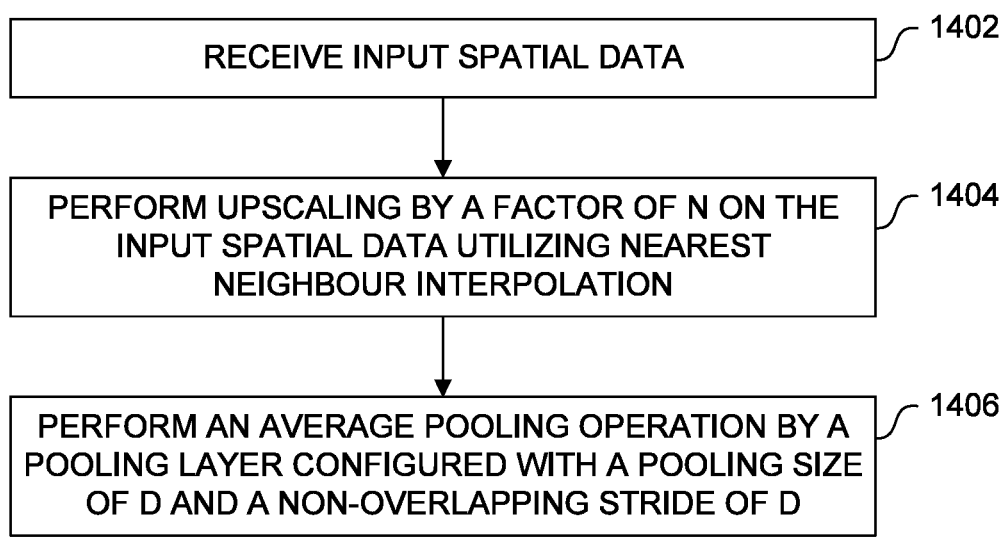
FIG. 14 is a flow chart illustrating another method of performing non-integer scaling according to another embodiment of the present disclosure.

Referring to FIG. 14, a flow chart illustrating a method of performing non-integer scaling of spatial data utilizing a pooling layer is shown by a scaling factor of N/D. At 1402, input spatial data is received. The input spatial data may be similar to the input previously described. Receiving the input spatial data may also include receiving the scaling factor N/D. Alternatively, the scaling factor may be predetermined and configured into the neural network hardware prior to performing the scaling.

As 1404, upscaling by a factor of N is performed using nearest neighbour interpolation. Nearest neighbour interpolation to perform the upscaling may be performed by any suitable technique, and may be performed as described previously. For example, the nearest neighbour interpolation may be performed by a hardware mapper by reading data from the appropriate memory location, as previously described, where the memory location from where to read is computed by the hardware mapper.

At 1406, an average pooling operation is performed on the upscaled data by a pooling layer. The pooling layer is configured with a pooling size of D with a non-overlapping stride of D. The output of the average pooling layer a downscaling of the input by a factor of 1/D. Thus, the upscaling of N followed by downscaling by 1/D results in rescaled spatial data is scaled by N/D relative to the inputs spatial data.

A benefit of performing scaling utilizing a pooling layer is that the scaled data is not interleaved, unlike scaling performed by a convolution layer, and naturally supports input spatial data that has more than one channel. Furthermore, integer upscaling using nearest neighbour interpolation may be performed efficiently, particularly when performed using modified hardware mapper, as described previously.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for performing data scaling on spatial data, the data scaling having a scaling factor given by N/D where N and D are positive integers, the method comprising:
   receiving input spatial data;
   dividing elements of the input spatial data into non-overlapping, contiguous input regions sized D×D elements;
   obtaining interpolation weight sets for N*N kernels, each kernel having an associated interpolation weight set, each kernel associated with an element of an scaled output region sized N×N elements, where each scaled output region is associated with a respective one of the input regions; and
   generating rescaled spatial data by, for each of the input regions, performing an interpolation operation that includes, using the interpolation weight set of each kernel, computing a weighted sum of the elements of input region utilizing the weight set to generate the element of the scaled output region associated with that kernel.

2. The method according to claim 1, wherein, when the spatial data includes more than one channel (c>1):
   generating N*N kernels comprises generating c*N*N kernels, the c*N*N kernels forming c channel groups having N*N kernels per group, the kernels of each channel group operating on a respective channel of the input data.

3. The method according to claim 1, wherein:
   the scaling factor includes a set of data scaling factors along each spatial dimension given by $N_x/D_x$ and $N_y/D_y$; and
   obtaining interpolation weights for N*N kernels comprises obtaining interpolation weight sets for $N_x*N_y$ kernels.

4. The method of claim 1, wherein the spatial data is two dimensional and the interpolation operation is a bilinear interpolation operation of the four nearest neighbour elements, and the interpolation weight set of a kernel are normalized relative distances of the output element associated with the kernel from each of the four nearest neighbour elements of the input region associated with the output element, the four nearest neighbour elements being the four elements of the input region that are closest in distance to a particular output element.

5. The method according to claim 4, wherein:
   when the scaling factor is less than one (N/D<1):
      obtaining interpolation weights for N*N kernels comprises obtaining, for each of the N*N kernels, a D×D array having non-zero bilinear interpolation weights at locations corresponding to four nearest neighbour elements of the input region to a given element of the scaled output region; and
      for each input region, performing the bilinear operation comprises, for each of the N*N kernels, performing a weighted sum between the kernel array and a D×D array formed by elements values of the elements of the input region to generate the element value of the element of the scaled output region associated with the kernel; and
   when the scaling factor is greater than one (N/D>1), the method further comprises padding the spatial data along each edge with one additional element, wherein:
      obtaining interpolation weights for N*N kernels comprises obtaining, for each of the N*N kernels, a (D+2)×(D+2) array having non-zero bilinear interpolation weights at locations corresponding to four nearest neighbour elements of a given element of the scaled output region; and for each input region, performing the bilinear operation comprises, for each of the N*N kernels, performing a weighted sum between the kernel array and a (D+2)×(D+2) array formed by elements values of the elements of the D×D input region and elements values of elements adjacent to the input region to generate the element value of the element of the scaled output region associated with the kernel.

6. The method of claim 1, wherein the spatial data is two dimensional, and the interpolation operation is a bicubic interpolation operation of the sixteen nearest neighbour elements, and the interpolation weight set of a kernel are normalized relative distances of the output element associated with the kernel from each of the sixteen nearest neighbour elements of the input region associated with the output element, the sixteen nearest neighbour elements being the sixteen elements that are closest in distance to a particular output element.

7. The method according to claim 6, wherein:

when the scaling factor is less than one (N/D<1), the method further comprises padding the spatial data along each edge with two additional elements, wherein:

obtaining interpolation weights for N*N kernels comprises obtaining, for each of the N*N kernels, a (D+4)×(D+4) array having non-zero bicubic interpolation weights at locations corresponding to sixteen nearest neighbour elements of the input region to a given element of the scaled output region; and for each input region, performing the bilinear operation comprises, for each of the N*N kernels, performing a weighted sum between the kernel array and a (D+4)×(D+4) array formed by elements values of the elements of the input region and elements values of elements adjacent to the D×D input region to generate the element value of the element of the scaled output region associated with the kernel; and when the scaling factor is greater than one (N/D>1), the method further comprises padding the spatial data along each edge with three additional elements, wherein:

obtaining interpolation weights for N*N kernels comprises obtaining, for each of the N*N kernels, a (D+6)×(D+6) array having non-zero bicubic interpolation weights at locations corresponding to sixteen nearest neighbour elements of a given element of the scaled output region; and for each input region, performing the bilinear operation comprises, for each of the N*N kernels, performing a weighted sum between the kernel array and a (D+6)×(D+6) array formed by elements values of the elements of the D×D input region and elements values of elements adjacent to the input region to generate the element value of the element of the scaled output region associated with the kernel.

8. The method according to claim 1, further comprising deinterleaving the rescaled spatial data to form deinterleaved rescaled spatial data, wherein the spatial location of each element in the deinterleaved scaled data ($x_{deinterleaved}$, $y_{deinterleaved}$) is determined by:

$$y_{deinterleaved} = y_{interleaved} * N + c // N$$

$$x_{deinterleaved} = x_{linterleaved} * N + c \% N$$

where c is the channel of the rescaled spatial data, ($x_{interleaved}$, $y_{interleaved}$) are spatial locations of the elements in the rescaled spatial data, // is the integer division operation, and % is the modulo operation.

9. A hardware accelerator for performing data scaling on spatial data, the data scaling having a scaling factor given by N/D where N and D are positive integers, the hardware accelerator comprising:

a processing element array comprising one or more processing elements configured to perform a weighted sum between a kernel array of interpolation weights and an array of element values;

a controller in communication with the processing element array and configured to:

receive input spatial data and the scaling factor;

divide elements of the input spatial data into non-overlapping, contiguous input regions sized D×D elements;

obtain interpolation weights for N*N kernels, each kernel having an associated interpolation weight set, each kernel associated with an element of an scaled output region sized N×N elements, where each scaled output region is associated with a respective one of the input regions;

send commands to the processing element array to utilize the N*N kernels and the input regions of the input spatial data to generate rescaled spatial data;

wherein the processing elements of the processing array are configured to:

receive the commands from the controller; and generate rescaled spatial data by, for each of the input regions, perform an interpolation operation that includes, using the interpolation weight set of each kernel, computing a weighted sum of the elements of input region utilizing the weight set to generate the element of the scaled output region associated with that kernel.

10. The hardware accelerator of claim 9, wherein:

the spatial data includes more than one channel (c>1); and the controller being configured to obtain the interpolation weights for the N*N kernels comprises the controller being configured to obtain interpolation weights for c*N*N kernels, the c*N*N kernels forming c channel groups having N*N kernels per group, the kernels of each channel group operating on a respective channel of the input data.

11. The hardware accelerator of claim 9, wherein:

the scaling factor includes a set of data scaling factors along each spatial dimension given by $N_x/D_x$ and $N_y/D_y$; and the controller being configured to obtain interpolation weights for N*N kernels comprises the controller being configure to obtain interpolation weights for $N_x*N_y$ kernels.

12. The hardware accelerator of claim 11, wherein the controller includes separate interpolation weight generator hardware that is configured to calculate the interpolation weight sets and send the interpolation weights to the processing array.

13. The hardware accelerator of claim 11, wherein the controller is configured to deinterleave the rescaled spatial data to form deinterleaved rescaled spatial data, wherein the spatial location of each element in the deinterleaved scaled data ($x_{deinterleaved}$, $y_{deinterleaved}$) is determined by:

$$y_{deinterleaved} = y_{interleaved} * N + c // N$$

$$x_{deinterleaved} = x_{linterleaved} * N + c \% N$$

where c is the channel of the rescaled spatial data, ($x_{interleaved}$, $y_{interleaved}$) are spatial locations of the elements in the rescaled spatial data, // is the integer division operation, and % is the modulo operation.

14. The hardware accelerator according to claim 13, wherein the controller includes separate deinterleaving address translator hardware that is configured to deinterleave the rescaled spatial data to form the deinterleaved spatial data.

15. The hardware accelerator according to claim 14, wherein the deinterleaving address translator is configured to deinterleave the rescaled spatial data either prior to transmitting the resample spatial data to a subsequent layer such that the deinterleaved rescaled spatial data is transmitted, or as the resample spatial data is output from the processing elements.

16. The hardware accelerator of claim 9, wherein the spatial data is two dimensional and the interpolation operation is a bilinear interpolation operation of the four nearest neighbour elements, and the interpolation weight set of a kernel are normalized relative distances of the output element associated with the kernel from each of the four nearest neighbour elements of the input region associated with the output element, the four nearest neighbour elements being the four elements of the input region that are closest in distance to a particular output element.

17. The hardware accelerator of claim 16, wherein:
the scaling factor is less than one (N/D<1);
the controller configured to obtain interpolation weights for N*N kernels comprises the controller configured to obtain, for each of the N*N kernels, a D×D array having non-zero bilinear interpolation weights at locations corresponding to four nearest neighbour elements of the input region to a given element of the scaled output region; and
the processing elements being configured to, for each input region, perform the bilinear operation comprises the processing elements being configured to, for each of the N*N kernels, perform a weighted sum between the kernel array and a D×D array formed by elements values of the elements of the input region to generate the element value of the element of the scaled output region associated with the kernel.

18. The hardware accelerator of claim 16, wherein:
the scaling factor is greater than one (N/D>1);
the controller is configured to pad the spatial data along each edge with one additional element to generate padded spatial data;
the controller being configured to obtain interpolation weights for N*N kernels comprises the controller being configured to obtain, for each of the N*N kernels, a (D+2)×(D+2) array having non-zero bilinear interpolation weights at locations corresponding to four nearest neighbour elements of a given element of the scaled output region;
the controller configured to send the command to the processing element array to utilize the input spatial data to generate the rescaled spatial data comprises the controller being configured to send the command to utilize the padded spatial data to generate the rescaled spatial data; and
the processing elements being configured to, for each input region, perform the bilinear operation comprises the processing elements being configured to, for each of the N*N kernels, performing a weighted sum between the kernel array and a (D+2)×(D+2) array formed by elements values of the elements of the D×D input region and elements values of elements adjacent to the input region to generate the element value of the element of the scaled output region associated with the kernel.

19. The hardware accelerator of claim 9, wherein the spatial data is two dimensional, and the interpolation operation is a bicubic interpolation operation of the sixteen nearest neighbour elements, and the interpolation weight set of a kernel are normalized relative distances of the output element associated with the kernel from each of the sixteen nearest neighbour elements of the input region associated with the output element, the sixteen nearest neighbour elements being the sixteen elements that are closest in distance to a particular output element.

20. The hardware accelerator of claim 19, wherein:
the scaling factor is less than one (N/D<1);
the controller is configured to pad the spatial data along each edge with two additional elements to generate first padded spatial data;
the controller being configured to obtain interpolation weights for N*N kernels comprises the controller being configured to obtain, for each of the N*N kernels, a (D+4)×(D+4) array having non-zero bicubic interpolation weights at locations corresponding to sixteen nearest neighbour elements of the input region to a given element of the scaled output region;
the controller configured to send the command to the processing element array to utilize the input spatial data to generate the rescaled spatial data comprises the controller being configured to send the command utilize the first padded spatial data to generate the rescaled spatial data; and
the processing elements being configured to, for each input region, perform the bilinear operation comprises the processing elements being configured to, for each of the N*N kernels, perform a weighted sum between the kernel array and a (D+4)×(D+4) array formed by elements values of the elements of the input region and elements values of elements adjacent to the D×D input region to generate the element value of the element of the scaled output region associated with the kernel.

21. The hardware accelerator of claim 19, wherein:
the scaling factor is greater than one (N/D>1);
the controller is configured to pad the spatial data along each edge with three additional elements to generate second padded spatial data;
the controller being configured to obtain interpolation weight sets for N*N kernels comprises the controller being configured to obtain, for each of the N*N kernels, a (D+6)×(D+6) array having non-zero bicubic interpolation weights at locations corresponding to sixteen nearest neighbour elements of a given element of the scaled output region;
the controller configured to send the command to the processing element array to utilize the input spatial data to generate the rescaled spatial data comprises the controller being configured to send the command to utilize the second padded spatial data to generate the rescaled spatial data; and
the processing elements being configured to, for each input region, perform the bilinear operation comprises the processing elements being configured to, for each of the N*N kernels, perform a weighted sum between the kernel array and a (D+6)×(D+6) array formed by elements values of the elements of the D×D input region and elements values of elements adjacent to the input region to generate the element value of the element of the scaled output region associated with the kernel.

22. A machine learning engine for performing data scaling on spatial data, the data scaling having a scaling factor given by N/D where N and D are positive integers, the machine learning engine comprising:
   a processor configured to:
      receive input spatial data and the scaling factor;
      divide elements of the input spatial data into non-overlapping, contiguous input regions sized D×D elements;
      obtain N*N kernels, each kernel having an interpolation weight set, each kernel associated with an element of an scaled output region sized N×N elements, where each scaled output region is associated with a respective one of the input regions; and
      generate rescaled spatial data by, for each of the input regions, perform an interpolation operation that includes, using the interpolation weight set of each kernel, computing a weighted sum of the elements of input region utilizing the weight set to generate the element of the scaled output region associated with that kernel.

* * * * *